US012567891B2

(12) United States Patent
Zhang et al.

(10) Patent No.: US 12,567,891 B2
(45) Date of Patent: Mar. 3, 2026

(54) METHODS FOR REDUCING OVERHEAD OF NR TYPE II CHANNEL STATE INFORMATION FEEDBACK USING ANGLE AND DELAY RECIPROCITY

(71) Applicant: Telefonaktiebolaget LM Ericsson (publ), Stockholm (SE)

(72) Inventors: Xinlin Zhang, Västra Frölunda (SE); Siva Muruganathan, Stittsville (CA); Mattias Frenne, Uppsala (SE); Fredrik Athley, Västra Frölunda (SE); Shiwei Gao, Nepean (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 327 days.

(21) Appl. No.: 18/257,939

(22) PCT Filed: Dec. 28, 2021

(86) PCT No.: PCT/IB2021/062398
§ 371 (c)(1),
(2) Date: Jun. 16, 2023

(87) PCT Pub. No.: WO2022/144778
PCT Pub. Date: Jul. 7, 2022

(65) Prior Publication Data
US 2024/0007164 A1 Jan. 4, 2024

Related U.S. Application Data

(60) Provisional application No. 63/131,665, filed on Dec. 29, 2020, provisional application No. 63/131,113, filed on Dec. 28, 2020.

(51) Int. Cl.
H04W 4/00 (2018.01)
H04B 7/0456 (2017.01)
(Continued)

(52) U.S. Cl.
CPC ......... H04B 7/0481 (2023.05); H04B 7/0626 (2013.01); H04B 7/10 (2013.01)

(58) Field of Classification Search
CPC ............................... H04B 7/0626; H04B 7/10
See application file for complete search history.

(56) References Cited

U.S. PATENT DOCUMENTS

2007/0211786 A1* 9/2007 Shattil ..................... H04J 13/00
375/147
2012/0275530 A1* 11/2012 Nazar .................. H04B 7/0456
375/267
(Continued)

FOREIGN PATENT DOCUMENTS

WO 2020/225642 A1 11/2020
WO 2020221581 A1 11/2020
(Continued)

OTHER PUBLICATIONS

International Search Report and Written Opinion dated Apr. 7, 2022 issued in PCT Application No. PCT/IB2021/062398 filed Dec. 28, 2021, consisting of 16 pages.
(Continued)

*Primary Examiner* — Elisabeth Benoit Magloire
(74) *Attorney, Agent, or Firm* — Weisberg I.P. Law, P.A.

(57) ABSTRACT

A method, network node and wireless device for reducing overhead of New Radio (NR) Type II channel state information (CSI) feedback using angle and delay reciprocity are disclosed. According to one aspect, a method in a wireless device (WD) includes receiving a configuration of CSI report setting that indicates frequency domain basis vectors from a discrete Fourier transform, CSI reference signal (RS) ports and a subset of pairs of spatial domain and frequency domain vectors for the $N_{CSI-RS}$ CSI-RS ports. The method also includes determining linear combination coefficients corresponding to the selected frequency domain basis vec-
(Continued)

BEGIN

CONFIGURE THE WD WITH A CHANNEL STATE INFORMATION, CSI, REPORT SETTING, THE CSI REPORT SETTING INCLUDING AT LEAST ONE OF S134

A CSI REFERENCE SIGNAL, CSI-RS, RESOURCE WITH N$_{CSI-RS}$ CSI-RS PORTS FOR CHANNEL MEASUREMENT, EACH OF THE N$_{CSI-RS}$ PORTS BEING ASSOCIATED WITH A PAIR OF SPATIAL DOMAIN, SD, AND FREQUENCY DOMAIN, FD, VECTORS S136

A FIRST SUBSET OF LENGTH N3 FREQUENCY DOMAIN, FD, BASIS VECTORS OF A DISCRETE FOURIER TRANSFORM, THE FIRST SUBSET COMPRISING N BASIS VECTORS, ONE OF WHICH IS A DIRECT CURRENT, DC, BASIS VECTOR CONTAINING ALL ONES, WHERE 1<=N<=N3 S138

A NUMBER M OF FD BASIS VECTORS OF A SECOND SUBSET OF M FD BASIS VECTORS, THE SECOND SUBSET BEING DETERMINED BY THE WD FROM THE FIRST SUBSET OF FD BASIS VECTORS, ONE OF THE M FD BASIS VECTORS BEING THE DC BASIS VECTOR, WHERE M<=N S140

TRANSMIT A CSI-RS TO THE WD S142

REQUEST THE WD TO FEED BACK A CSI BASED ON A CSI-RS AND ACCORDING TO THE CSI REPORT SETTING S144

RECEIVE FROM THE WD A CSI REPORT INCLUDING AT LEAST ONE OF: S146

AN INDICATION OF A NUMBER OF TRANSMISSION LAYERS S148

AN INDICATION OF A SELECTION BY THE WD OF A SUBSET OF THE N$_{CSI-RS}$ CSI-RS PORTS S150

AN INDICATION OF A SELECTION BY THE WD OF M FD BASIS VECTORS OUT OF THE N FD BASIS VECTORS S152

AN INDICATION OF A SET OF LINEAR COMBINATION COEFFICIENTS ASSOCIATED WITH THE SELECTED SUBSET OF THE CSI-RS PORTS AND THE SELECTED M FREQUENCY DOMAIN BASIS VECTORS PER TRANSMISSION LAYER S154

AN INDICATION OF A TOTAL NUMBER OF NON-ZERO LINEAR COMBINATION COEFFICIENTS ASSOCIATED WITH ALL THE M FREQUENCY DOMAIN BASIS VECTORS S156

END tors and the selected subset of CSI-RS ports, determining linear combination coefficients corresponding to the selected frequency domain basis vectors and the selected subset of pairs of vectors in the spatial domain and the frequency domain.

16 Claims, 18 Drawing Sheets

(51) Int. Cl.
| | |
|---|---|
| *H04B 7/06* | (2006.01) |
| *H04B 7/10* | (2017.01) |

(56) References Cited

U.S. PATENT DOCUMENTS

| | | | | |
|---|---|---|---|---|
| 2020/0267712 | A1* | 8/2020 | Cirik ..................... | H04W 72/23 |
| 2020/0322012 | A1 | 10/2020 | Wernersson et al. | |
| 2021/0167835 | A1* | 6/2021 | Wang ....................... | H04B 7/10 |
| 2022/0224391 | A1* | 7/2022 | Ramireddy .......... | H04B 7/0417 |
| 2023/0299914 | A1* | 9/2023 | Lim .................... | H04B 7/0639 |
| | | | | 370/329 |

FOREIGN PATENT DOCUMENTS

| | | |
|---|---|---|
| WO | 2021/242154 A1 | 2/2021 |
| WO | 2021/209206 A1 | 10/2021 |
| WO | 2022009178 A1 | 1/2022 |

OTHER PUBLICATIONS

Written Opinion of the International Preliminary Examining Authority dated Dec. 1, 2022 issued in PCT Application No. PCT/IB2021/062398 filed Dec. 28, 2021, consisting of 5 pages.

International Preliminary Report on Patentability dated Feb. 13, 2023 issued in PCT Application No. PCT/IB2021/062398 filed Dec. 28, 2021, consisting of 33 pages.

3GPP TSG RAN WG1 103-e; R1-2009452; Source: Intel Corporation; Title: On CSI Enhancements for MTRP and FDD Reciprocity; Agenda Item: 8.1.4; Document for: Discussion and Decision; e-Meeting, Oct. 26-Nov. 13, 2020, consisting of 13 pages.

3GPP TSG RAN WG1 98; R1-1909583; Source: Samsung; Title: Feature Lead Summary: Agreements on MU-MIMO CSI Until RAN #98; Agenda Item: 7.2.8.1; Document for: Discussion and Decision; Prague, Czech Republic, Aug. 26-30, 2019, consisting of 6 pages.

3GPP TS 38.212 V16.0.0 (Dec. 2019) 3rd Generation Partnership Project; Technical Specification Group Radio Access Network; NR; Multiplexing and Channel Coding (Release 16), consisting of 145 pages.

3GPP TS 38.214 V16.3.0 (Sep. 2020) 3rd Generation Partnership Project; Technical Specification Group Radio Access Network; NR; Physical layer procedures for data (Release 16), consisting of 166 pages.

Japanese Office Action dated Aug. 6, 2024 and English language summary translation of the Japanese Office Action issued in corresponding Japanese Application No. 2023-539260, consisting of 7 pages.

3GPP TSG RAN WG1 Meeting #103-e R1-2007592; Agenda Item: 8.1.4; Source: Huawei, HiSilicon; Title: Discussion on CSI enhancements for Rel-17; Document for: Discussion and Decision; E-meeting, Oct. 26-Nov. 13, 2020, consisting of 18 pages.

GPP TSG RAN WG1 Meeting #103-e R1-2008909; Agenda item: 8.1.4; Source: Nokia, Nokia Shanghai Bell Title: Enhancement on CSI measurement and reporting; Document for: Discussion and Decision; e-Meeting, Oct. 26-Nov. 13, 2020, consisting of 21 pages.

3GPP TSG-RAN WG1 Meeting #103-e R1-2009224; Agenda Item: 8.1.4; Source: Ericsson; Title: On CSI enhancements in Rel-17 feMIMO; Document for: Discussion; Online, Oct. 26-Nov. 13, 2020, consisting of 10 pages.

\* cited by examiner

--PRIOR ART--

--PRIOR ART--

--PRIOR ART--

--PRIOR ART--

STEP 1:
- IN UL, WD SOUNDS SRS.
- gNB ESTIMATES $\tau_i$ AND ANGLE $\theta_i, \varphi_i$ TO PROPAGATION CLUSTERS.

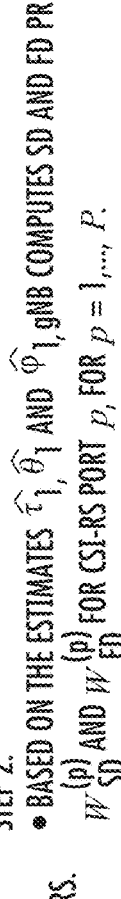

STEP 2:
- BASED ON THE ESTIMATES $\hat{\tau}_1, \hat{\theta}_1$ AND $\hat{\varphi}_1$, gNB COMPUTES SD AND FD PRECODERS $W^{(p)}_{SD}$ AND $W^{(p)}_{FD}$ FOR CSI-RS PORT $p$, FOR $p = 1, ..., P$.

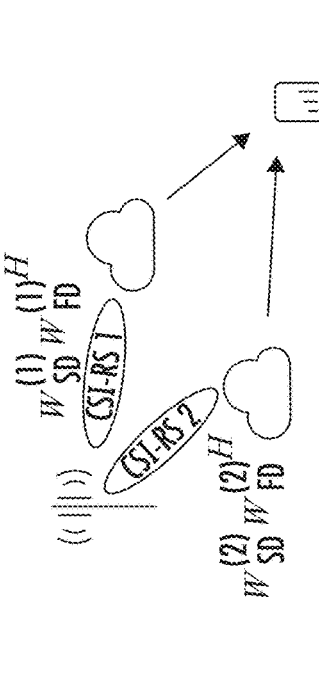

STEP 3:
- WD MEASURES THE CSI-RS PORTS, AND COMPUTES AND FEEDS BACK THE COMPLEX COEFFICIENTS $W^{(p)}_2$ FOR COMBINING THE $P$ PORTS.

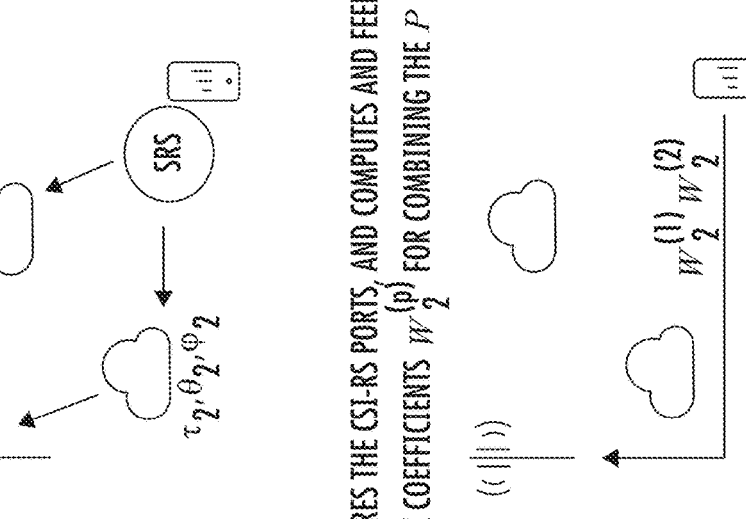

STEP 4:
- IN DL, gNB COMPUTES PDSCH PRECODER BASED ON $W^{(p)}_{SD}, W^{(p)}_{FD}$ AND WD FEEDBACK, AND PERFORMS PDSCH TRANSMISSION

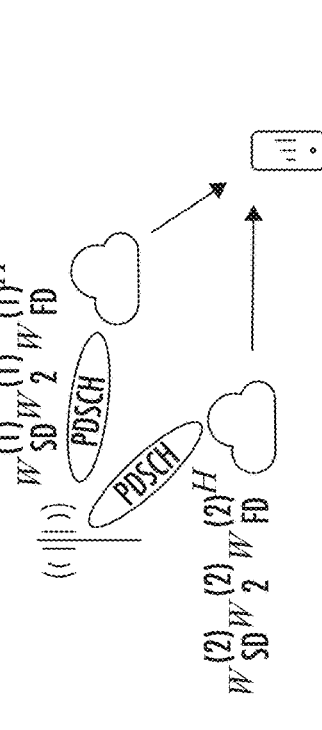

FIG. 5

--PRIOR ART--

--PRIOR ART--

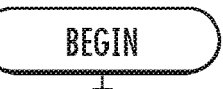

BEGIN

CONFIGURE THE WD WITH A CHANNEL STATE INFORMATION, CSI, REPORT SETTING, THE CSI REPORT SETTING INCLUDING AT LEAST ONE OF S134

A CSI REFERENCE SIGNAL, CSI-RS, RESOURCE WITH $N_{CSI-RS}$ CSI-RS PORTS FOR CHANNEL MEASURMENT, EACH OF THE $N_{CSI-RS}$ PORTS BEING ASSOCIATED WITH A PAIR OF SPATIAL DOMAIN, SD, AND FREQUENCY DOMAIN, FD, VECTORS S136

A FIRST SUBSET OF LENGTH N3 FREQUENCY DOMAIN, FD, BASIS VECTORS OF A DISCRETE FOURIER TRANSFORM, THE FIRST SUBSET COMPRISING N BASIS VECTORS, ONE OF WHICH IS A DIRECT CURRENT, DC, BASIS VECTOR CONTAINING ALL ONES, WHERE 1<=N<=N3 S138

A NUMBER M OF FD BASIS VECTORS OF A SECOND SUBSET OF M FD BASIS VECTORS, THE SECOND SUBSET BEING DETERMINED BY THE WD FROM THE FIRST SUBSET OF FD BASIS VECTORS, ONE OF THE M FD BASIS VECTORS BEING THE DC BASIS VECTOR, WHERE M<=N S140

TRANSMIT A CSI-RS TO THE WD S142

REQUEST THE WD TO FEED BACK A CSI BASED ON A CSI-RS AND ACCORDING TO THE CSI REPORT SETTING S144

RECEIVE FROM THE WD A CSI REPORT INCLUDING AT LEAST ONE OF: S146

AN INDICATION OF A NUMBER OF TRANSMISSION LAYERS S148

AN INDICATION OF A SELECTION BY THE WD OF A SUBSET OF THE $N_{CSI-RS}$ CSI-RS PORTS S150

AN INDICATION OF A SELECTION BY THE WD OF M FD BASIS VECTORS OUT OF THE N FD BASIS VECTORS S152

AN INDICATION OF A SET OF LINEAR COMBINATION COEFFICIENTS ASSOCIATED WITH THE SELECTED SUBSET OF THE CSI-RS PORTS AND THE SELECTED M FREQUENCY DOMAIN BASIS VECTORS PER TRANSMISSION LAYER S154

AN INDICATION OF A TOTAL NUMBER OF NON-ZERO LINEAR COMBINATION COEFFICIENTS ASSOCIATED WITH ALL THE M FREQUENCY DOMAIN BASIS VECTORS S156

END

FIG. 14

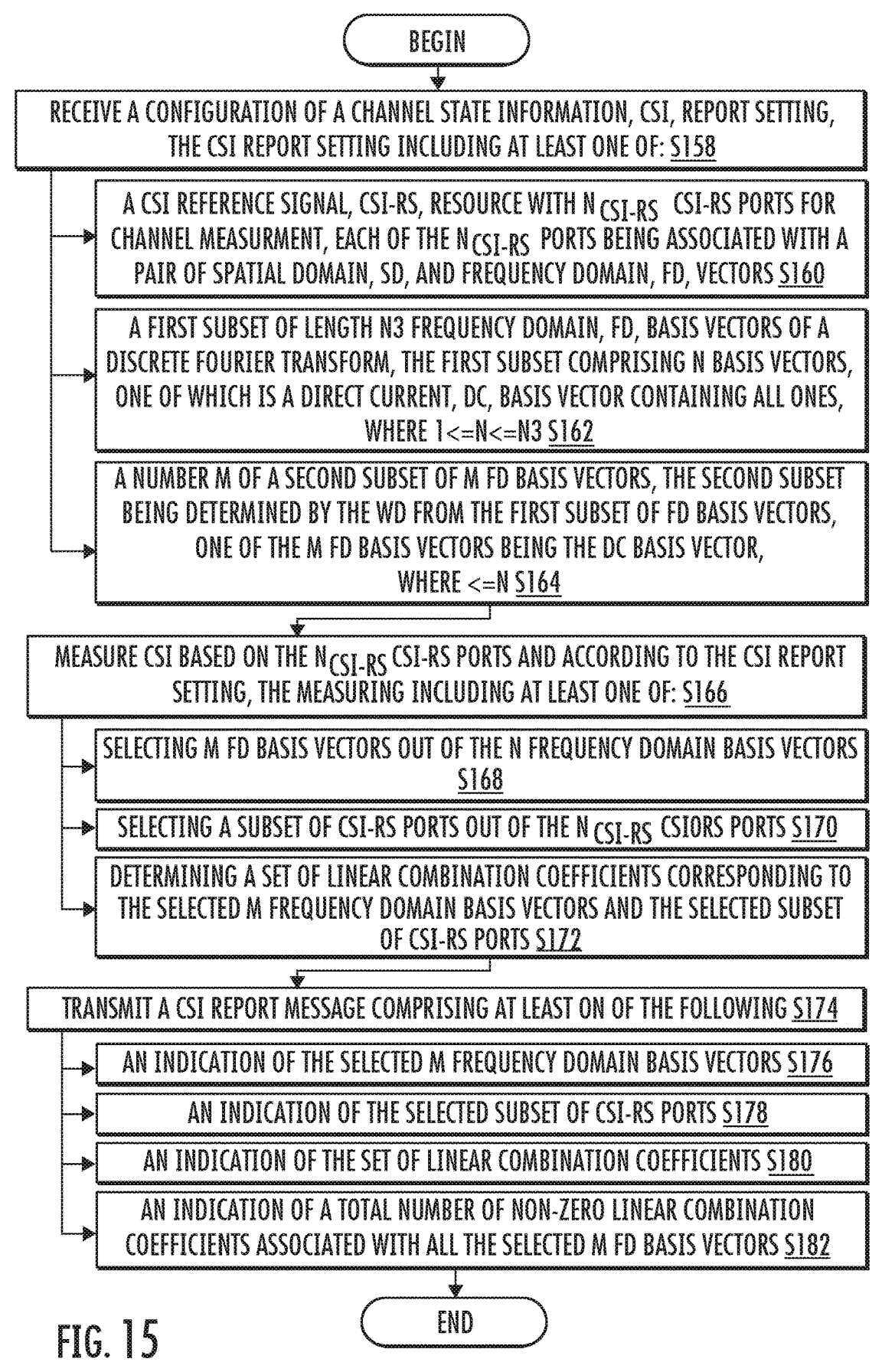

BEGIN

RECEIVE A CONFIGURATION OF A CHANNEL STATE INFORMATION, CSI, REPORT SETTING, THE CSI REPORT SETTING INCLUDING AT LEAST ONE OF: S158

A CSI REFERENCE SIGNAL, CSI-RS, RESOURCE WITH $N_{CSI-RS}$ CSI-RS PORTS FOR CHANNEL MEASURMENT, EACH OF THE $N_{CSI-RS}$ PORTS BEING ASSOCIATED WITH A PAIR OF SPATIAL DOMAIN, SD, AND FREQUENCY DOMAIN, FD, VECTORS S160

A FIRST SUBSET OF LENGTH N3 FREQUENCY DOMAIN, FD, BASIS VECTORS OF A DISCRETE FOURIER TRANSFORM, THE FIRST SUBSET COMPRISING N BASIS VECTORS, ONE OF WHICH IS A DIRECT CURRENT, DC, BASIS VECTOR CONTAINING ALL ONES, WHERE 1<=N<=N3 S162

A NUMBER M OF A SECOND SUBSET OF M FD BASIS VECTORS, THE SECOND SUBSET BEING DETERMINED BY THE WD FROM THE FIRST SUBSET OF FD BASIS VECTORS, ONE OF THE M FD BASIS VECTORS BEING THE DC BASIS VECTOR, WHERE <=N S164

MEASURE CSI BASED ON THE $N_{CSI-RS}$ CSI-RS PORTS AND ACCORDING TO THE CSI REPORT SETTING, THE MEASURING INCLUDING AT LEAST ONE OF: S166

SELECTING M FD BASIS VECTORS OUT OF THE N FREQUENCY DOMAIN BASIS VECTORS S168

SELECTING A SUBSET OF CSI-RS PORTS OUT OF THE $N_{CSI-RS}$ CSIORS PORTS S170

DETERMINING A SET OF LINEAR COMBINATION COEFFICIENTS CORRESPONDING TO THE SELECTED M FREQUENCY DOMAIN BASIS VECTORS AND THE SELECTED SUBSET OF CSI-RS PORTS S172

TRANSMIT A CSI REPORT MESSAGE COMPRISING AT LEAST ON OF THE FOLLOWING S174

AN INDICATION OF THE SELECTED M FREQUENCY DOMAIN BASIS VECTORS S176

AN INDICATION OF THE SELECTED SUBSET OF CSI-RS PORTS S178

AN INDICATION OF THE SET OF LINEAR COMBINATION COEFFICIENTS S180

AN INDICATION OF A TOTAL NUMBER OF NON-ZERO LINEAR COMBINATION COEFFICIENTS ASSOCIATED WITH ALL THE SELECTED M FD BASIS VECTORS S182

END

FIG. 15

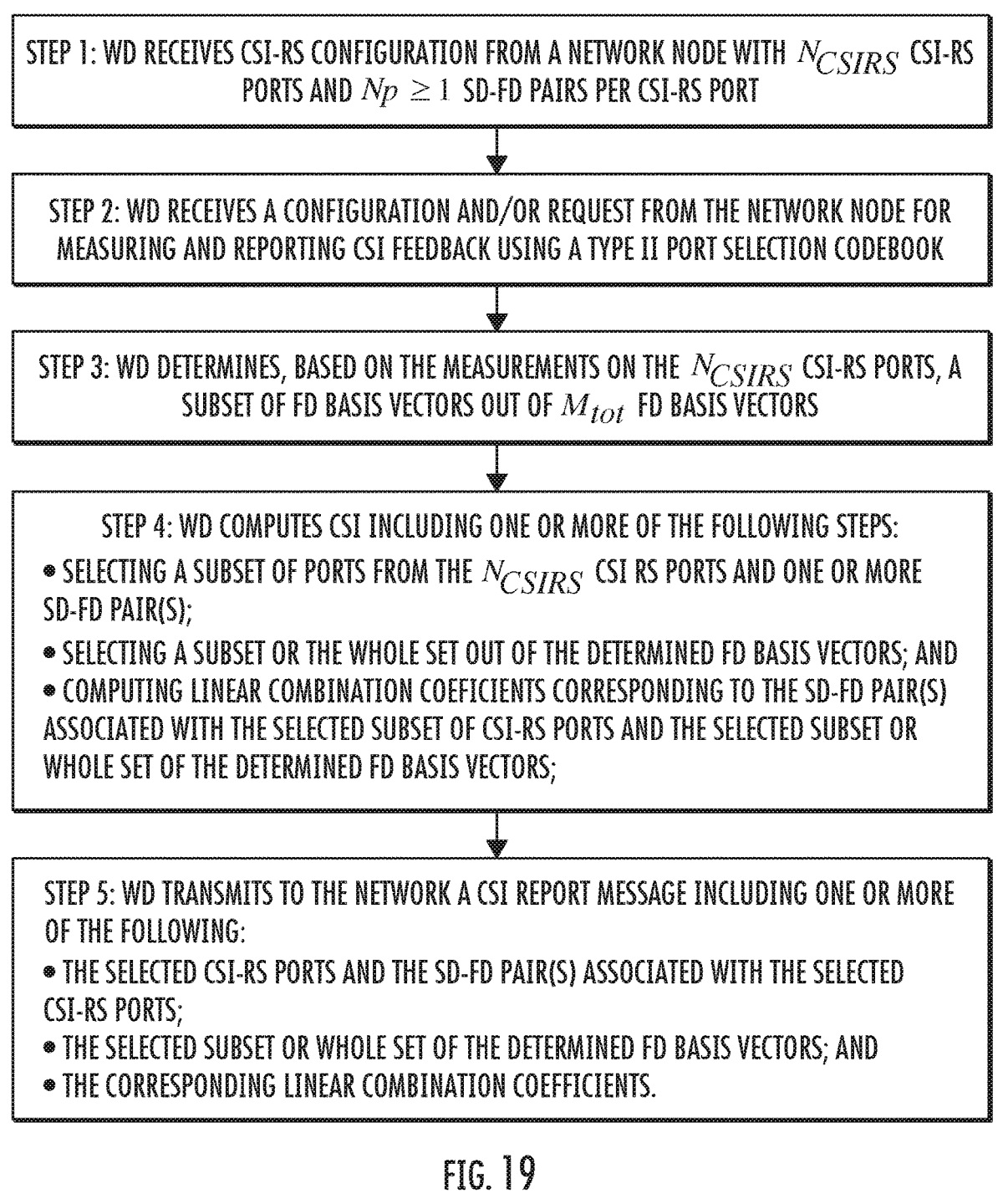

STEP 1: WD RECEIVES CSI-RS CONFIGURATION FROM A NETWORK NODE WITH $N_{CSIRS}$ CSI-RS PORTS AND $Np \geq 1$ SD-FD PAIRS PER CSI-RS PORT STEP 2: WD RECEIVES A CONFIGURATION AND/OR REQUEST FROM THE NETWORK NODE FOR MEASURING AND REPORTING CSI FEEDBACK USING A TYPE II PORT SELECTION CODEBOOK STEP 3: WD DETERMINES, BASED ON THE MEASUREMENTS ON THE $N_{CSIRS}$ CSI-RS PORTS, A SUBSET OF FD BASIS VECTORS OUT OF $M_{tot}$ FD BASIS VECTORS

STEP 4: WD COMPUTES CSI INCLUDING ONE OR MORE OF THE FOLLOWING STEPS:

• SELECTING A SUBSET OF PORTS FROM THE $N_{CSIRS}$ CSI RS PORTS AND ONE OR MORE SD-FD PAIR(S);

• SELECTING A SUBSET OR THE WHOLE SET OUT OF THE DETERMINED FD BASIS VECTORS; AND

• COMPUTING LINEAR COMBINATION COEFICIENTS CORRESPONDING TO THE SD-FD PAIR(S) ASSOCIATED WITH THE SELECTED SUBSET OF CSI-RS PORTS AND THE SELECTED SUBSET OR WHOLE SET OF THE DETERMINED FD BASIS VECTORS;

STEP 5: WD TRANSMITS TO THE NETWORK A CSI REPORT MESSAGE INCLUDING ONE OR MORE OF THE FOLLOWING:

• THE SELECTED CSI-RS PORTS AND THE SD-FD PAIR(S) ASSOCIATED WITH THE SELECTED CSI-RS PORTS;

• THE SELECTED SUBSET OR WHOLE SET OF THE DETERMINED FD BASIS VECTORS; AND

• THE CORRESPONDING LINEAR COMBINATION COEFFICIENTS.

FIG. 19

METHODS FOR REDUCING OVERHEAD OF NR TYPE II CHANNEL STATE INFORMATION FEEDBACK USING ANGLE AND DELAY RECIPROCITY

CROSS-REFERENCE TO RELATED APPLICATIONS

This application is a Submission Under 35 U.S.C. § 371 for U.S. National Stage Patent Application of International Application No.: PCT/IB2021/062398, filed Dec. 28, 2021 entitled "METHODS FOR REDUCING OVERHEAD OF NR TYPE II CHANNEL STATE INFORMATION FEEDBACK USING ANGLE AND DELAY RECIPROCITY," which claims priority to U.S. Provisional Application No. 63/131,113, filed Dec. 28, 2020, entitled "METHODS FOR REDUCING OVERHEAD OF NR TYPE II CSI FEEDBACK USING ANGLE AND DELAY RECIPROCITY," and U.S. Provisional Application No. 63/131,665, filed Dec. 29, 2020 the entireties of all of which are incorporated herein by reference.

TECHNICAL FIELD

The present disclosure relates to wireless communications, and in particular, to reducing overhead of New Radio (NR) Type II channel state information (CSI) feedback using angle and delay reciprocity.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

Codebook-Based Processing

Multi-antenna techniques can significantly increase the data rates and reliability of a wireless communication system. The performance is improved if both the transmitter and the receiver are equipped with multiple antennas, which results in a multiple-input multiple-output (MIMO) communication channel. Such systems and/or related techniques are commonly referred to as MIMO.

The NR standard is currently evolving with enhanced MIMO support. A core component in NR is the support of MIMO antenna deployments and MIMO related techniques such as spatial multiplexing. The spatial multiplexing mode is aimed for high data rates in favorable channel conditions. An illustration of an example of spatial multiplexing operation is provided in FIG. 1.

As seen, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

NR uses orthogonal frequency division multiplexing (OFDM) in the downlink (and discrete Fourier Transform (DFT) precoded OFDM in the uplink for rank-1 transmission) and hence the received $N_R \times 1$ vector $y_n$ for a certain TFRE on subcarrier n (or alternatively data TFRE number n) is thus modeled by:

$$y_n = H_n W s_n + e_n$$

where $e_n$ is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the WD.

In closed-loop precoding for the NR downlink, the WD transmits, based on channel measurements in the downlink, recommendations to the network node (eNB or gNB) of a suitable precoder to use. The network node configures the WD to provide feedback according to CSI-ReportConfig and may transmit CSI-RS and configure the WD to use measurements of CSI-RS to feed back recommended precoding matrices that the WD selects from a codebook. A single precoder that is supposed to cover a large bandwidth (wideband precoding) may be fed back. It may also be beneficial to match the frequency variations of the channel and instead, feed back a frequency-selective precoding report, e.g., several precoders, one per subband. This is an example of the more general case of channel state information (CSI) feedback, which also encompasses feeding back other information than recommended precoders to assist the network node, e.g., gNodeB, in subsequent transmissions to the WD. Such other information may include channel quality indicators (CQIs) as well as transmission rank indicators (RI). In NR, CSI feedback can be either wideband, where one CSI is reported for the entire channel bandwidth, or frequency-selective, where one CSI is reported for each subband, which is defined as a number of contiguous resource blocks ranging between 4-32 physical resource blocks (PRBS) depending on the band width part (BWP) size.

Given the CSI feedback from the WD, the network node determines the transmission parameters it wishes to use to transmit to the WD, including the precoding matrix, transmission rank, and modulation and coding scheme (MCS). These transmission parameters may differ from the recommendations the WD makes. The transmission rank, and thus the number of spatially multiplexed layers, is reflected in the number of columns of the precoder W. For efficient performance, a transmission rank that matches the channel properties should be selected.

2D Antenna Arrays

Two dimensional antenna arrays may be partly described by the number of antenna columns corresponding to the horizontal dimension $N_h$, the number of antenna rows corresponding to the vertical dimension $N_v$ and the number of dimensions corresponding to different polarizations $N_p$. The total number of antennas is thus $N = N_h N_v N_p$. It should be pointed out that the concept of an antenna is non-limiting in the sense that it can refer to any virtualization (e.g., linear mapping) of the physical antenna elements. For example, pairs of physical sub-elements could be fed the same signal, and hence share the same virtualized antenna port.

An example of a 4×4 array with dual-polarized antenna elements is illustrated in FIG. 2.

Precoding may be interpreted as multiplying the signal with different beamforming weights for each antenna prior to transmission. A typical approach is to tailor the precoder to the antenna form factor, i.e., taking into account $N_h$, $N_v$ and $N_p$ when designing the precoder codebook.

Channel State Information Reference Signals (CSI-RS)

For CSI measurement and feedback, CSI-RS are defined. A CSI-RS is transmitted on each antenna port and is used by a WD to measure the downlink channel between each of the transmit antenna ports and each of its receive antenna ports. The transmit antenna ports are also referred to as CSI-RS ports. The supported number of antenna ports in NR are 11, 2, 4, 8, 12, 16, 24 and 321. By measuring the received CSI-RS, a WD can estimate the channel that the CSI-RS is traversing, including the radio propagation channel and antenna gains. The CSI-RS for the above purpose is also referred to as Non-Zero Power (NZP) CSI-RS.

CSI-RS can be configured to be transmitted in certain resource elements (Res) in a slot and certain slots. FIG. 3 shows an example of CSI-RS REs for 12 antenna ports, where 1 RE per resource block (RB) per port is shown.

In addition, an interference measurement resource (IMR) is also defined in NR for a WD to measure interference. An IMR resource contains 4 REs: either 4 adjacent REs in frequency in the same OFDM symbol or 2 by 2 adjacent REs in both time and frequency in a slot. By measuring both the channel based on NZP CSI-RS and the interference based on an IMR, a WD can estimate the effective channel and noise plus interference to determine the CSI, i.e., rank, precoding matrix, and the channel quality. Further, a WD in NR may be configured to measure interference based on one or multiple NZP CSI-RS resources.

CSI Framework in NR

In NR, a WD can be configured with multiple CSI reporting settings and multiple CSI-RS resource settings. Each resource setting can contain multiple resource sets, and each resource set can contain up to 8 CSI-RS resources. For each CSI reporting setting, a WD feeds back a CSI report.

Each CSI reporting setting contains at least the following information:

A CSI-RS resource set for channel measurement;

An IMR resource set for interference measurement;

Optionally, a CSI-RS resource set for interference measurement;

Time-domain behavior, i.e., periodic, semi-persistent, or aperiodic reporting;

Frequency granularity, i.e., wideband or subband;

CSI parameters to be reported such as RI, PMI, CQI, and CSI-RS resource indicator (CRI) in case of multiple CSI-RS resources in a resource set;

Codebook types, i.e., type I or II, and codebook subset restriction;

Measurement restriction; and

Subband size. One out of two possible subband sizes is indicated, the value range depends on the bandwidth of the BWP. One CQI/PMI (if configured for subband reporting) is fed back per subband).

When the CSI-RS resource set in a CSI reporting setting contains multiple CSI-RS resources, one of the CSI-RS resources is selected by a WD and a CSI-RS resource indicator (CRI) is also reported by the WD to indicate to the network node about the selected CSI-RS resource in the resource set, together with RI, PMI and CQI associated with the selected CSI-RS resource.

For aperiodic CSI reporting in NR, more than one CSI reporting setting, each with a different CSI-RS resource set for channel measurement and/or resource set for interference measurement can be configured and triggered at the same time. In this case, multiple CSI reports are aggregated and sent from the WD to the network node in a single physical uplink shared channel (PUSCH).

3GPP Rel-16 Enhanced Type II Port Selection Codebook

The enhanced Type II (eType II) port selection (PS) codebook was introduced in 3GPP Technical Release 16 (3GPP Rel-16), which is intended to be used for beamformed CSI-RS, where each CSI-RS port covers a small portion of the cell coverage area with high beamforming gain (comparing to non-beamformed CSI-RS). Although it depends on the network node implementation, it is usually assumed that each CSI-RS port is transmitted in a 2D spatial beam which has a main lobe with an azimuth pointing angle and an elevation pointing angle. The actual precoder matrix used for CSI-RS is transparent to the WD. Based on the measurement, the WD selects the best CSI-RS ports and recommends a rank, a precoding matrix, and a CQI conditioned on the rank and the precoding matrix, to the network node to be used by the network node for DL transmission. The precoding matrix comprises linear combinations of the selected CSI-RS ports. The eType II PS codebook can be used by the WD to feed back the selected CSI-RS ports and the combining coefficients.

Structure, Configuration and Reporting of eType II PS Codebook

For a given transmission layer 1, with $1 \in \{1, \ldots, v\}$ and v being the rank indicated by the rank indicator (RI), the precoder matrix is given by a size $P_{CSI-RS} \times N_3$ matrix $W^l$, where:

$P_{CSI-RS}$ is the number of CSI-RS ports;

$N_3 = N_{SB} \times R$ is the number of subbands for PMI, where:

The value R={1,2} (the PMI subband size indicator) is RRC configured;

$N_{SB}$ is the number of CQI subbands, which is also RRC configured; and

The maximum RI value v is set according to the configured higher layer parameter typeII-RI-Restriction-r16. The WD may not report v>4.

For each layer 1, the precoding matrix $W^l$ can be factorized as $W^l = W_1 W_{2,l} W_{f,l}^H$ and $W^l = [w_{0,l}, w_{1,l}, \ldots, w_{N_3-1,l}]$ is normalized such that $\|w_{t,l}\|_F = 1/\sqrt{v}$, for l=1, . . . , v and t=0, 1, . . . , $N_3-1$. See FIG. 4.

Port selection matrix $W_1$:

$W_1$ is a size $P_{CSI-RS} \times 2L$ port selection precoder matrix that can be factored into $$W_1 = \begin{bmatrix} 1 & 0 \\ 0 & 1 \end{bmatrix} \otimes W_{PS},$$

where $\otimes$ denotes a Kronecker product and:

$W_{PS} = [w_1^{(0)} \ldots w_1^{(L-1)}]$ is a size $$\frac{P_{CSI-RS}}{2} \times L$$

port selection matrix, where $w_1^{(i)}$ of size $$\frac{P_{CSI-RS}}{2} \times 1,$$

for i=0, 1, . . . , L−1, contains one element 1 that indicates the selected CSI-RS port while all the other elements are 0s. L is the number of selected CSI-RS ports from each polarization and the same ports are selected for both polarizations;

Supported L values can be found in Table 1;

Selected CSI-RS ports are indicated by $i_{1,1} \in$ $$\left\{ 0, 1, \ldots, \left\lceil \frac{P_{CSI-RS}}{2d} \right\rceil - 1 \right\},$$

which is reported by the WD to network node:

The value of $i_{1,1}$ is determined by WD based on CSI-RS measurement;

The value of d is configured with the higher layer parameter portSelectionSamplingSize, where d∈{1, 2, 3, 4} and $$d < \min\left(\frac{P_{CSI-RS}}{2}, L\right);$$

$W_1$ is common for all layers:

$W_{f,l} = [w_{f,l}^{(0)} \ldots w_{f,l}^{(M_v-1)}]$, where $\{w_{f,l}^{(k)}\}_{k=0}^{M_v-1}$ are $M_v$ frequency domain (FD) basis vectors that are selected from $N_3$ orthogonal DFT basis vectors $\{f_t\}_{t=0}^{N_3-1}$, where $$f_t = \left[ 1 e^{\frac{j2\pi t}{N_3}}, \ldots, e^{\frac{j2\pi(N_3-1)t}{N_3}} \right]^T,$$

$(.)^T$ denotes transpose;

For $N_3 \leq 19$, a one-step free selection is used:

For each layer, FD basis selection is indicated with a $$\left\lceil \log_2 \binom{N_3 - 1}{M_v - 1} \right\rceil \text{ bit}$$

combinatorial indicator. In TS 38.214, the combinatorial indicator is given by the index $i_{1,6,l}$ where l corresponds to the layer index. This combinatorial index is reported by WD to the network node per layer;

For $N_3 > 19$, a two-step selection with layer-common intermediary subset (IntS) is used:

In this first step, a window-based layer-common IntS selection is used, which is parameterized by $M_{initial}$. The IntS consists of FD basis vectors mod($M_{initial}$+n, $N_3$), where n=0, 1, . . . , $N_3'$−1 and $N_3'$=2$M_v$. In 3GPP Technical Standard (TS) 38.214, the selected IntS is reported by the WD to the network node via the parameter $i_{1,5}$, which is reported per layer as part of the PMI reported;

The second step subset selection is indicated by an $$\left\lceil \log_2 \binom{N_3' - 1}{M_v - 1} \right\rceil \text{-bit}$$

combinatorial indicator for each layer. In 3GPP TS 38.214, the combinatorial indicator is given by the index $i_{1,6,l}$ where l corresponds to the layer index. This combinatorial index is reported by WD to the network node per layer;

$W_{f,l}$ is layer-specific:

Linear combination coefficient matrix $W_{2,l}$:

$W_{2,l}$ is a size 2L=$M_v$ matrix that contains 2L$M_v$ coefficients for linearly combining the selected $M_v$ FD basis vectors and the selected 2L CSI-RS ports;

For layer l, only a subset of $K_l^{NZ} \leq K_0$ coefficients are non-zero and reported. The remaining 2L$M_v$−$K_l^{NZ}$ non-reported coefficients are considered zero:

$K_0 = \lceil \beta \times 2LM_l \rceil$ is the maximum number of non-zero coefficients per layer, where β is a RRC configured parameter. Supported β values are shown in Table 1;

For v∈{2, 3, 4}, the total number of non-zero coefficients summed across all layers, $K_{tot}^{NZ} = \Sigma_{l=1}^v K_l^{NZ}$, may satisfy $K_{tot}^{NZ} \leq 2K_0$;

Selected coefficient subset for each layer is indicated with $K_l^{NZ}$ is in a size 2L$M_v$ bitmap, $i_{1,7,l}$;

The selected CSI-RS port associated with the strongest coefficient of layer l is identified by $i_{1,8,l} \in \{0, 1, \ldots, 2L-1\}$;

The amplitude coefficients in $W_{2,l}$ are indicated by $i_{2,3,l}$ and $i_{2,4,l}$, and the phase coefficients in $W_{2,l}$ are indicated by $i_{2,5,l}$; and $W_{2,l}$ is layer-specific.

TABLE 1

3GPP Rel-16 eType II PS codebook parameter
configurations for L, $p_v$ and β

| paramCombination-r16 | L | $v \in \{1, 2\}$ | $v \in \{3, 4\}$ | β |
|---|---|---|---|---|
| | | $p_v$ | | |
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ¼ | ¼ | ¾ |
| 6 | 4 | ½ | ¼ | ½ |

The PMI reported by the WD comprises codebook indices $i_1$ and $i_2$ where:

$$i_1 = \begin{cases} [i_{1,1} i_{1,5} i_{1,6,1} i_{1,7,1} i_{1,8,1}] & v = 1 \\ [i_{1,1} i_{1,5} i_{1,6,1} i_{1,7,1} i_{1,8,1} i_{1,6,2} i_{1,7,2} i_{1,8,2}] & v = 2 \\ [i_{1,1} i_{1,5} i_{1,6,1} i_{1,7,1} i_{1,8,1} i_{1,6,2} i_{1,7,2} i_{1,8,2} i_{1,6,3} i_{1,7,3} i_{1,8,3}] & v = 3 \\ [i_{1,1} i_{1,5} i_{1,6,1} i_{1,7,1} i_{1,8,1} i_{1,6,2} i_{1,7,2} i_{1,8,2} i_{1,6,3} i_{1,7,3} i_{1,8,3} i_{1,6,4} i_{1,7,4} i_{1,8,4}] & v = 4 \end{cases}$$

$$i_2 = \begin{cases} [i_{2,3,1} i_{2,4,1} i_{2,5,1}] & v = 1 \\ [i_{2,3,1} i_{2,4,1} i_{2,5,1} i_{2,3,2} i_{2,4,2} i_{2,5,2}] & v = 2 \\ [i_{2,3,1} i_{2,4,1} i_{2,5,1} i_{2,3,2} i_{2,4,2} i_{2,5,2} i_{2,3,3} i_{2,4,3} i_{2,5,3}] & v = 3 \\ [i_{2,3,1} i_{2,4,1} i_{2,5,1} i_{2,3,2} i_{2,4,2} i_{2,5,2} i_{2,3,3} i_{2,4,3} i_{2,5,3} i_{2,3,4} i_{2,4,4} i_{2,5,4}] & v = 4 \end{cases}$$

7

The precoding matrix has the PMI values according to Table 2.

TABLE 2

| Numbers of layers | Precoding Matrix for PMI subband $t \in (0, 1, \ldots, N_3)$ |
|---|---|
| $\upsilon = 1$ | $W_t^{(\upsilon=1)} = w_{1,t}$ |
| $\upsilon = 2$ | $W_t^{(\upsilon=2)} = [w_{1,t}\ w_{2,t}]$ |
| $\upsilon = 3$ | $W_t^{(\upsilon=3)} = [w_{1,t}\ w_{2,t}\ w_{3,t}]$ |
| $\upsilon = 4$ | $W_t^{(\upsilon=4)} = [w_{1,t}\ w_{2,t}\ w_{3,t}\ w_{4,t}]$ |

$$w_{t,l} = \frac{1}{\sqrt[4]{\upsilon}} \frac{1}{\sqrt[2]{\gamma_{t,l}}} \begin{bmatrix} \sum_{i=0}^{L-1} v_{i_{1},1d+i} p_{l,0}^{(1)} \sum_{f=0}^{M_\upsilon-1} y_{t,l}^{(f)} p_{l,i,f}^{(2)} \varphi_{l,i,f} \\ \sum_{i=0}^{L-1} v_{i_{1},1d+i} p_{l,1}^{(1)} \sum_{f=0}^{M_\upsilon-1} y_{t,l}^{(f)} p_{l,i+L,f}^{(2)} \varphi_{l,i+L,f} \end{bmatrix},$$

$l = 1, 2, 3, 4; t = 0, 1, \ldots, N_3 - 1.$ $$\gamma_{t,l} = \sum_{i=0}^{2L-1} \left( p_{l,\lfloor \frac{i}{L} \rfloor}^{(1)} \right)^2 \left| \sum_{f=0}^{M_\upsilon-1} y_{t,l}^{(f)} p_{l,i,f}^{(2)} \varphi_{l,i,f} \right|^2$$

$v_m$ is a $P_{CSI\text{-}RS}/2$-element column vector containing a value of 1 in element (m mod $P_{CSI\text{-}RS}/2$) and zeros elsewhere $y_{t,l}^{(f)} = e^{j\frac{2\pi t n_{3,l}^{(f)}}{N_3}}$, $t = 0, 1, \ldots, N_3 - 1; f = 0, 1, \ldots, M_\upsilon - 1; l = 1, 2, 3, 4.$ $n_{3,l}^{(f)} \in (0, 1, \ldots, N_3 - 1)$ is derived from $i_{1,6,l}$ and if $N_3 > 19$, $i_{1,5}$ $p_{l,p}^{(1)}$, $p \in (0, 1)$ is a wideband amplitude coefficient indicated by $i_{2,3,l}$ $p_{l,i,f}^{(2)}$ is a subband amplitude coefficient indicated by $i_{2,4,l}$ $\varphi_{l,i,f} = e^{j\frac{2\pi c_{l,i,f}}{16}}$, $c_{l,i,f} \in \{0, \ldots, 15\}$ is phase coefficient indicated by $i_{2,5,l}$ For 3GPP Rel-16 Enhanced Type II CSI feedback, a CSI report includes two parts. Part 1 has a fixed payload size and is used to identify the number of information bits in Part 2. Part 1 contains RI, CQI, and an indication of the overall number of non-zero amplitude coefficients across layers, i.e., $K_{tot}^{NZ} \in \{1, 2, \ldots, 2K_0\}$. Part 2 contains the PMI. Part 1 and 2 are separately encoded.

Frequency Division Duplex (FDD)-Based Reciprocity Operation

In FDD operation, the uplink (UL) and downlink (DL) transmissions are carried out on different frequencies, thus the propagation channels in UL and DL are not reciprocal as in the TDD case. Despite of this, some physical channel parameters, e.g., delays and angles to different clusters, which depend on the spatial properties of the channel but not the carrier frequency, are reciprocal between UL and DL. Such properties can be exploited to obtain partial reciprocity based FDD transmission. The reciprocal part of the channel can be combined with the non-reciprocal part in order to obtain the complete channel. An estimate of the non-reciprocal part can be obtained by feedback from the WD.

Procedure for FDD-Based Reciprocity Operation

One example procedure for reciprocity based FDD transmission is illustrated in FIG. 5 in 4 steps, assuming that 3GPP Rel-16 enhanced Type II port-selection codebook is used. Note that although FIG. 5 makes reference to a gNB, an eNB (an LTE base station) may also be employed to implement the procedure illustrated by FIG. 5. In some embodiments, only some of the Steps 1-4 are performed by a WD. In some of these embodiments, results associated with steps not performed by the WD are either performed elsewhere and derived and/or obtained by the WD in a different manner, or they may be replaced by alternate steps.

In Step 1, the WD is configured with a sounding reference signal (SRS) by the network node and the WD transmits a SRS in the UL to enable the network node to estimate the angles and delays of different clusters, which are associated with different propagation paths.

In Step 2, in a network node implementation algorithm, the network node selects dominant clusters according to the estimated angle-delay power spectrum profile based on which a set of spatial-domain and frequency-domain (SD-FD) basis pairs are computed by the network node for CSI-RS beamforming. Each SD-FD pair corresponds to a CSI-RS port with certain delay being pre-compensated. Each CSI-RS port resource can contain one or multiple SD-FD basis pairs by applying different delays on different resource elements of the resource. The network node pre-codes all of the CSI-RS ports in a configured CSI-RS resource or multiple CSI-RS resources to the WD, with each configured CSI-RS resource containing the same number of SD-FD basis pairs.

In Step 3, the network node has configured the WD to measure CSI-RS, and the WD measures the received CSI-RS ports. Then, the WD determines a type II CSI including RI, PMI for each layer and CQI. The precoding matrix indicated by the PMI includes the selected SD-FD basis pairs/precoded CSI-RS ports, and the corresponding best phase and amplitude for co-phasing the selected pairs/ports. The phase and amplitude for each pair/port are quantized and fed back to the network node.

In Step 4, the network node implementation algorithm computes the DL precoding matrix per layer based on the selected beams and the corresponding amplitude and phase feedback. The network node then performs physical downlink shared channel (PDSCH) transmission. The transmission is based on the feed-back (PMI) precoding matrices directly (e.g., SU-MIMO transmission) or the transmission precoding matrix is obtained from an algorithm combining CSI feedback from multiple WDs (MU-MIMO transmission). In this case, a precoder derived based on the precoding matrices (including the CSI reports from co-scheduled WDs) (e.g., Zero-Forcing (ZF) precoder or regularized ZF precoder). The final precoder is commonly scaled so that the transmit power per power amplifier is not overridden.

Such reciprocity-based transmission can potentially be utilized in a codebook-based downlink (DL) transmission for FDD in order to, for example, reduce the feedback overhead in the uplink (UL) when NR Type II port-selection codebook is used. Another potential benefit is reduced complexity of the CSI calculation in the WD.

Note that FIG. 5 only sketches one example of the procedure for FDD-based reciprocity operation, where each CSI-RS port contains a single pair of SD-FD basis and the WD performs wideband averaging of the channel to obtain the corresponding coefficients. It is possible that each CSI-RS port contains multiple pairs of SD-FD basis and that WD can compress the channel with more FD components besides the DC DFT component.

Type II Port Selection Codebook for FDD Operation Based on Angle and Delay Reciprocity If the 3GPP Rel-16 enhanced Type II port-selection codebook is used for FDD operation based on angle and/or delay reciprocity, the frequency-domain (FD) basis $W_f$ still needs to be determined by the WD. Therefore, in the CSI report, the feedback overhead for indicating which FD basis vectors are selected can be large, especially when $N_3$, the number of PMI subbands, is large. Also, the computational complexity at WD for evaluating and selecting the best FD basis vectors also increases as $N_3$ increases.

A method has been proposed in which by utilizing the delay reciprocity between UL and DL, the network node can pre-determine a subset of FD basis, $\tilde{W}_f = [f_{k_0}\ f_{k_1}, \ldots f_{k_{M-1}}]$, where $k_i = 0, 1, \ldots, N_3 - 1; i = 0, 1, \ldots, M-1; M \leq N_3;$ $$f_t = \left[ 1 e^{\frac{j2\pi t}{N_3}}, \ldots, e^{\frac{j2\pi(N_3-1)t}{N_3}} \right]^T$$

9 and t=0, 1, . . . , $N_3$−1, based on the estimated delay information to the selected clusters in UL. Then, the network node can indicate to the WD about this pre-determined subset of FD basis $\tilde{W}_f$. The WD can then evaluate and select FD basis vectors within the pre-determined subset.

In one known method, the network node determines the angles and delays of the different clusters by analyzing the angle-delay power spectrum of the channel. For example, the 8×10 grid on the left side of FIG. 6 shows the angle-delay power spectrum of an UL channel with 8 angle bins and 10 delay taps, where each colored square represents the power level for a given cluster at certain angle and delay. Based on angle reciprocity, network node selects, in this example, 2 strongest clusters and precodes one CSI-RS port per polarization for transmission towards each cluster (i.e., a total of 4 CSI-RS ports with two polarizations). On the right side of FIG. 6, there are only 4 delay taps in the delay domain in the two beamformed channels (i.e., the two beamformed channels correspond to the two selected clusters), while in the original channel there are 10 taps. Therefore, the 4 delay taps that remain, which can be translated to an FD basis with 4 vectors, $\tilde{W}_f=[f_{k_0} \; f_{k_1} \; . . . \; f_{k_3}]$, can be conveyed by the network node to the WD, such that the WD only needs to select the best frequency basis vectors from the 4 FD basis vector candidates instead of 10. Thus, in this example, the overhead for indicating which FD bases are selected can be decreased, and the computation complexity at the WD for selecting the best FD bases can be reduced.

In another known method, the network node pre-compensates the delays for each beamformed channel such that the strongest path in all beamformed channels arrive at WD at the same time. As shown in FIG. 7, after pre-compensating the delay for the beamformed channels, the number of delay taps reduces to 3 in the two beamformed channels corresponding to the two selected clusters. This is in contrast to the 10 delay taps in the raw channel. Moreover, since the zeroth delay component (which corresponds to the zeroth FD basis vector, i.e., DC basis) always exists, network node only needs to signal the WD the remaining 2 FD basis vectors $\tilde{W}_f=[f_{k_0} \; f_{k_1}]$. Hence, the WD only needs to select the best frequency basis vectors from the 2 FD basis vector candidates instead of 4 as in the case of the example in FIG. 5. Thus, in this example, not only the overhead for indicating which FD components that have been selected is reduced, but also the overhead in reporting corresponding linear combination (LC) coefficients from the WD to the network node can be reduced. Additionally, the computational complexity at the WD for selecting the best FD bases can be reduced.

Hence, known solutions can be used to reduce the CSI feedback overhead for indicating which FD basis vectors are used, and also the corresponding phase and amplitude for combining the selected FD and SD basis. Also, some known solutions reduce the computational complexity for the WD to select the best FD basis vectors.

Another known method includes signaling a selected subset of FD basis vectors among a full set of FD basis vectors. Solutions based on both medium access control (MAC) control element (CE) signaling and downlink control information (DCI) signaling are proposed to reduce overhead associated with signaling FD basis vectors. In addition, methods for signaling CSI-RS ports to be measured have also been proposed which can be jointly signaled with the selected subset of FD basis vectors.

Known methods using the delay reciprocity between UL and DL to predetermine a subset of FD basis and how to signal these FD basis to the WD from the network node can lead to overhead savings in CSI reporting. However, for the case of reciprocity-based Type II CSI feedback, how the CSI feedback overhead is reduced and how the WD prioritizes/reports different parts of CSI are unsolved problems.

SUMMARY

Some embodiments advantageously provide methods, network nodes, and wireless devices (WDs) for reducing overhead of New Radio (NR) Type II channel state information (CSI) feedback using angle and delay reciprocity.

Some embodiments provide a framework for Type II CSI reporting that can achieve lower reporting overhead by utilizing angle and delay reciprocity. In particular, several methods include joint encoding of selected SD-FD basis pairs and CSI-RS ports, joint encoding of NZC bitmap and selected SD-FD basis pairs/CSI-RS ports, etc.

Some advantages of some embodiments may include reduced CSI reporting overhead for both CSI report part 1 and part 2 and reduced WD complexity for PMI calculation.

According to one aspect, a network node is configured to communicate with a wireless device, WD. The network node includes processing circuitry configured to configure the WD with a channel state information, CSI, report setting, the CSI report setting including at least one of: a CSI reference signal, CSI-RS, resource with $N_{CSI-RS}$ CSI-RS ports for channel measurement, each of the $N_{CSI-RS}$ ports being associated with a pair of spatial domain, SD, and frequency domain, FD, vectors; a first subset of length $N_3$ frequency domain, FD, basis vectors of a discrete Fourier transform, the first subset comprising N basis vectors, one of which is a direct current, DC, basis vector containing all ones, where 1<=N<=$N_3$; and a number M of FD basis vectors of a second subset of M FD basis vectors, the second subset being determined by the WD from the first subset of FD basis vectors, one of the M FD basis vectors being the DC basis vector, where M<=N. The network node also includes a radio interface (62) in communication with the processing circuitry and configured to: transmit a CSI-RS to the WD; request the WD to feedback a CSI based on a CSI-RS and according to the CSI report setting; and receive from the WD a CSI report comprising at least one of: an indication of a number of transmission layers; an indication of a selection by the WD of a subset of the $N_{CSI-RS}$ CSI-RS ports; an indication of a selection by the WD of M FD basis vectors out of the N FD basis vectors; an indication of a set of linear combination coefficients associated with the selected subset of the CSI-RS ports and the selected M frequency domain basis vectors per transmission layer; and an indication of a total number of non-zero linear combination coefficients associated with all the M frequency domain basis vectors.

According to this aspect, in some embodiments, the radio interface is further configured to receive a non-zero coefficient, NZC, bitmap, for each transmission layer, wherein each bit in the bitmap is associated with one of the selected CSI-RS ports and one of the M FD basis vectors. In some embodiments, the radio interface is configured to receive from the WD an indication of a selection by the WD of the M frequency domain basis vectors only when N is greater than one and M is less than N.

According to another aspect, a method in a network node configured to communicate with a wireless device, WD, includes: configuring the WD with a channel state information, CSI, report setting, the CSI report setting including at least one of: a CSI reference signal, CSI-RS, resource with $N_{CSI-RS}$ CSI-RS ports for channel measurement, each of the $N_{CSI-RS}$ ports being associated with a pair of spatial domain, SD, and frequency domain, FD, vectors; a first subset of length $N_3$ frequency domain, FD, basis vectors of a discrete Fourier transform, the first subset comprising N basis vectors, one of which is a direct current, DC, basis vector containing all ones, where $1<=N<=N_3$; and a number M of FD basis vectors of a second subset of M FD basis vectors, the second subset being determined by the WD from the first subset of FD basis vectors, one of the M FD basis vectors being the DC basis vector, where $M<=N$; and transmitting a CSI-RS to the WD; requesting the WD to feedback a CSI based on a CSI-RS and according to the CSI report setting; receiving from the WD a CSI report comprising at least one of: an indication of a number of transmission layers; an indication of a selection by the WD of a subset of the $N_{CSI-RS}$ CSI-RS ports; an indication of a selection by the WD of M FD basis vectors out of the N FD basis vectors; an indication of a set of linear combination coefficients associated with the selected subset of the CSI-RS ports and the selected M frequency domain basis vectors per transmission layer; and an indication of one of a total number of non-zero linear combination coefficients, NZC, per transmission layer associated with non-DC frequency domain basis vectors in the M frequency domain basis vectors, and an indication of a total number of non-zero linear combination coefficients associated with all the M frequency domain basis vectors.

According to this aspect, in some embodiments, the method includes receiving a non-zero coefficient, NZC, bitmap, for each transmission layer, wherein each bit in the bitmap is associated with one of the selected CSI-RS ports and one of the M FD basis vectors. In some embodiments, the method also includes receiving from the WD an indication of a selection by the WD of the M frequency domain basis vectors only when N is greater than one and M is less than N.

According to yet another aspect, a wireless device, WD configured to communicate with a network node includes: processing circuitry configured to: receive a configuration of a channel state information, CSI, report setting, the CSI report setting including at least one of: a CSI reference signal, CSI-RS, resource with $N_{CSI-RS}$ CSI-RS ports for channel measurement, each of the $N_{CSI-RS}$ ports being associated with a pair of spatial domain, SD, and frequency domain, FD, vectors; a first subset of length $N_3$ frequency domain, FD, basis vectors of a discrete Fourier transform, the first subset including N basis vectors, one of which is a direct current, DC, basis vector containing all ones, where $1<=N<=N_3$; and a number M of a second subset of M FD basis vectors, the second subset being determined by the WD from the first subset of FD basis vectors, one of the M FD basis vectors being the DC basis vector, where $<=N$; measure CSI based on the $N_{CSI-RS}$ CSI-RS ports and according to the CSI report setting, the measuring including at least one of: selecting M FD basis vectors out of the N frequency domain basis vectors; selecting a subset of CSI-RS ports out of the $N_{CSI-RS}$ CSI-RS ports; determining a set of linear combination coefficients corresponding to the selected M frequency domain basis vectors and the selected subset of CSI-RS ports. The WD also includes a radio interface in communication with the processing circuitry and configured to transmit a CSI report message comprising at least one of the following: an indication of the selected M frequency domain basis vectors; an indication of the selected subset of CSI-RS ports; an indication of the set of linear combination coefficients; and an indication of a total number of non-zero linear combination coefficients associated with all the selected M FD basis vectors.

According to this aspect, in some embodiments, the processing circuitry is further configured to choose $N_{p,sel}/2$ pairs of vectors that are common to two polarizations out of a total of $N_p N_{CSI-RS}/2$ pairs of vectors using at most $$\left\lceil \log_2 \left( \binom{N_p N_{CSIRS}/2}{N_{p,sel}/2} \right) \right\rceil \text{bits}$$

to report for each transmission layer, wherein $N_{p,sel}$ is a total number of ports to be selected for both polarizations, and $N_p=1$. In some embodiments, when N=1, the first subset of frequency domain basis vectors is a set containing only the DC frequency domain basis vector. In some embodiments, the radio interface is configured to transmit an indication of a selection of the selected M frequency domain basis vectors only when M #N and M is greater than one. In some embodiments, the processing circuitry is further configured to select a second subset of frequency domain basis vectors for frequency domain channel compression. In some embodiments, the selected M frequency domain basis vectors is common for all transmission layers.

According to another aspect, a method in a wireless device, WD configured to communicate with a network node includes: receiving a configuration of a channel state information, CSI, report setting, the CSI report setting including at least one of: a CSI reference signal, CSI-RS, resource with $N_{CSI-RS}$ CSI-RS ports for channel measurement, each of the $N_{CSI-RS}$ ports being associated with a pair of spatial domain, SD, and frequency domain, FD, vectors; a first subset of length $N_3$ frequency domain, FD, basis vectors of a discrete Fourier transform, the first subset including N basis vectors, one of which is a direct current, DC, basis vector containing all ones, where $1<=N<=N_3$; and a number M of a second subset of M FD basis vectors, the second subset being determined by the WD from the first subset of FD basis vectors, one of the M FD basis vectors being the DC basis vector, where $<=N$; and measuring CSI based on the $N_{CSI-RS}$ CSI-RS ports and according to the CSI report setting, the measuring including at least one of: selecting M FD basis vectors out of the N frequency domain basis vectors; selecting a subset of CSI-RS ports out of the $N_{CSI-RS}$ CSI-RS ports; determining a set of linear combination coefficients corresponding to the selected M frequency domain basis vectors and the selected subset of CSI-RS ports; and transmitting a CSI report message comprising at least one of the following: an indication of the selected M frequency domain basis vectors; an indication of the selected subset of CSI-RS ports; an indication of the set of linear combination coefficients; and an indication of one of a total number of non-zero linear combination coefficients associated with non-DC FD basis vectors in the selected M FD basis vectors, and an indication of a total number of non-zero linear combination coefficients associated with all the selected M FD basis vectors.

According to this aspect, in some embodiments, the method also includes choosing $N_{p,sel}/2$ pairs of vectors that are common to two polarizations out of a total of $N_p N_{CSI-RS}/2$ pairs of vectors using at most $$\left\lceil \log_2 \left( \binom{N_p N_{CSIRS}/2}{N_{p,sel}/2} \right) \right\rceil \text{bits}$$

to report for each transmission layer, wherein $N_{p,sel}$ is a total number of ports to be selected or both polarizations, and $N_p=1$. In some embodiments, when $N=1$, the first subset of frequency domain basis vectors is a set containing only the DC frequency domain basis vector. In some embodiments, the method also includes transmitting an indication of a selection of the selected M frequency domain basis vectors only when $M \neq N$ and M is greater than one. In some embodiments, the method also includes selecting a second subset of frequency domain basis vectors for frequency domain channel compression. In some embodiments, the selected M frequency domain basis vectors is common for all transmission layers.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 illustrates a procedure for codebook based transmission;

FIG. 14 is a flowchart of an example process in a network node for reducing overhead of New Radio (NR) Type II channel state information (CSI) feedback using angle and delay reciprocity;

FIG. 15 is a flowchart of an example process in a wireless device for reducing overhead of New Radio (NR) Type II channel state information (CSI) feedback using angle and delay reciprocity;

FIG. 19 is a flowchart of an example process performed by a wireless device (WD)

DETAILED DESCRIPTION

Figure 1:
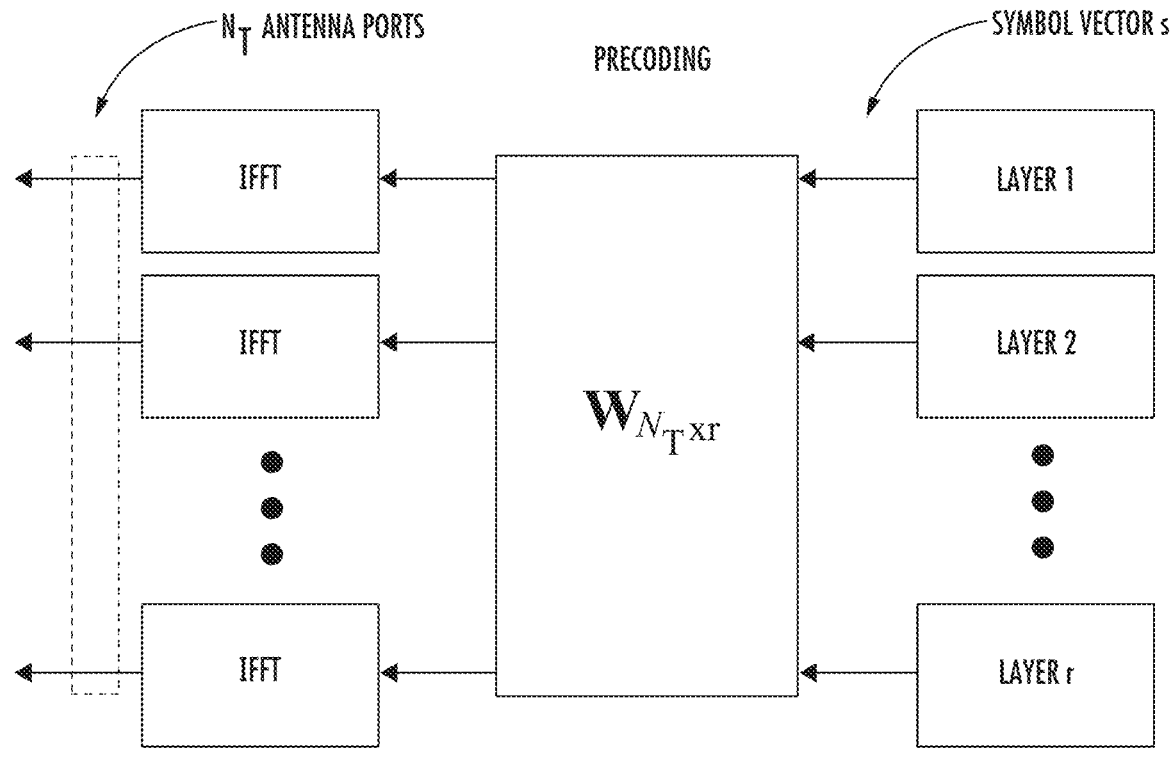
FIG. 1 illustrates a known transmission architecture.
Figure 2:
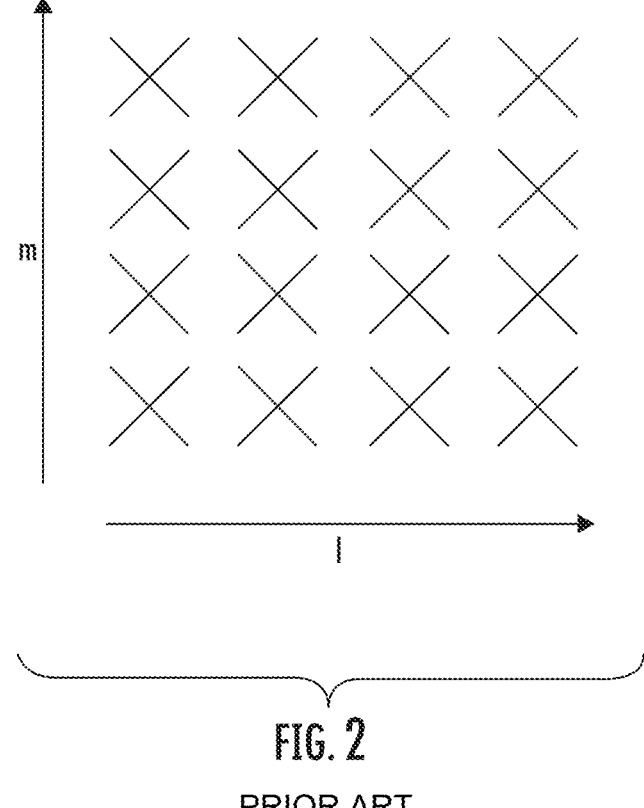
FIG. 2 illustrates at two dimensional antenna array.
Figure 3:
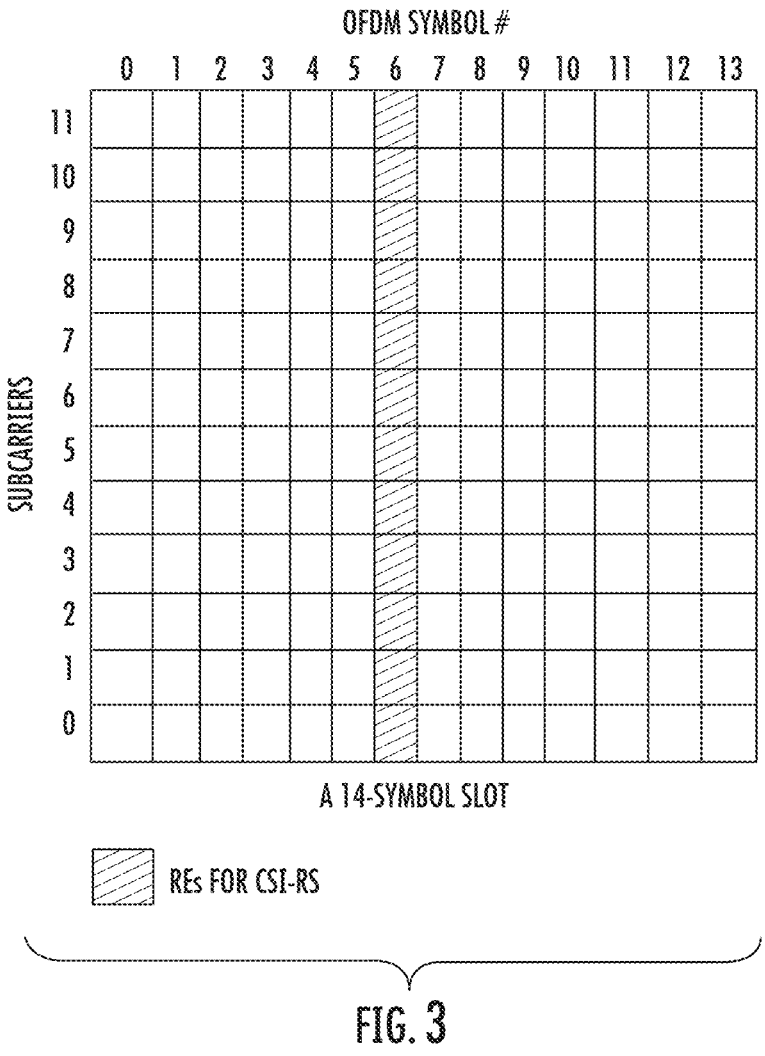
FIG. 3 illustrates an example of resource element allocation.
Figure 4:
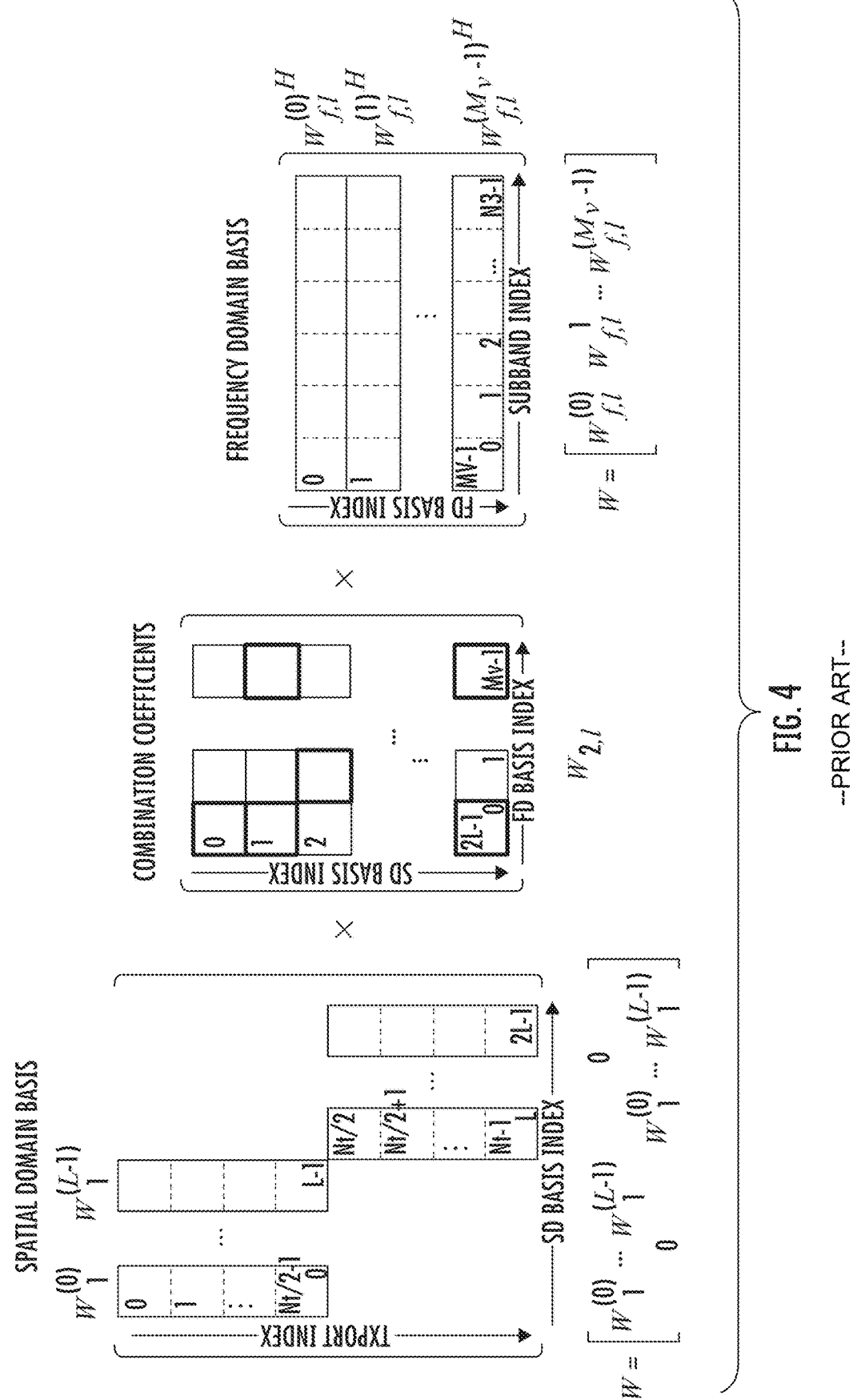
FIG. 4 illustrates factorization of a precoder.
Figure 6:
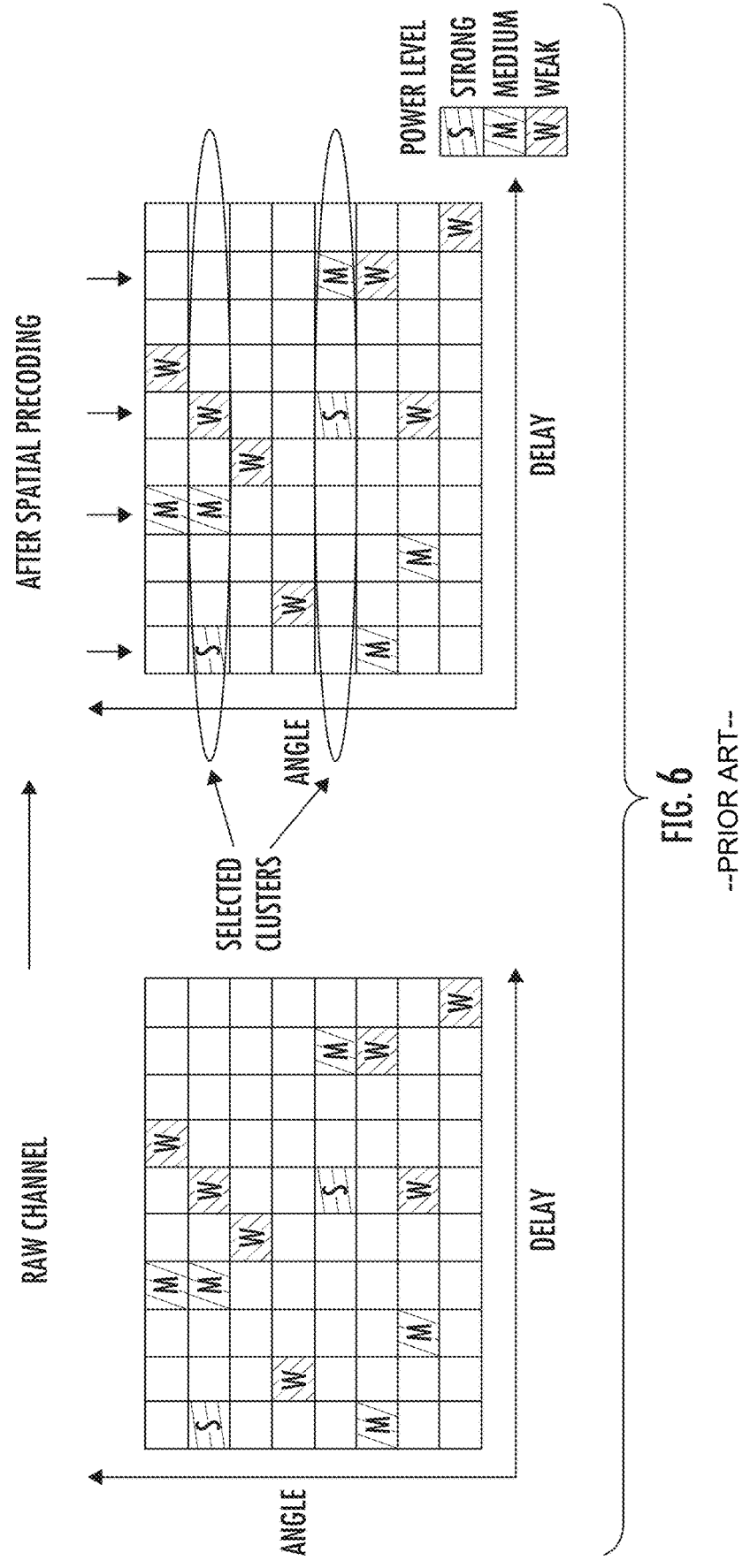
FIG. 6 illustrates angle-delay power spectrum before and after spatial precoding.
Figure 7:
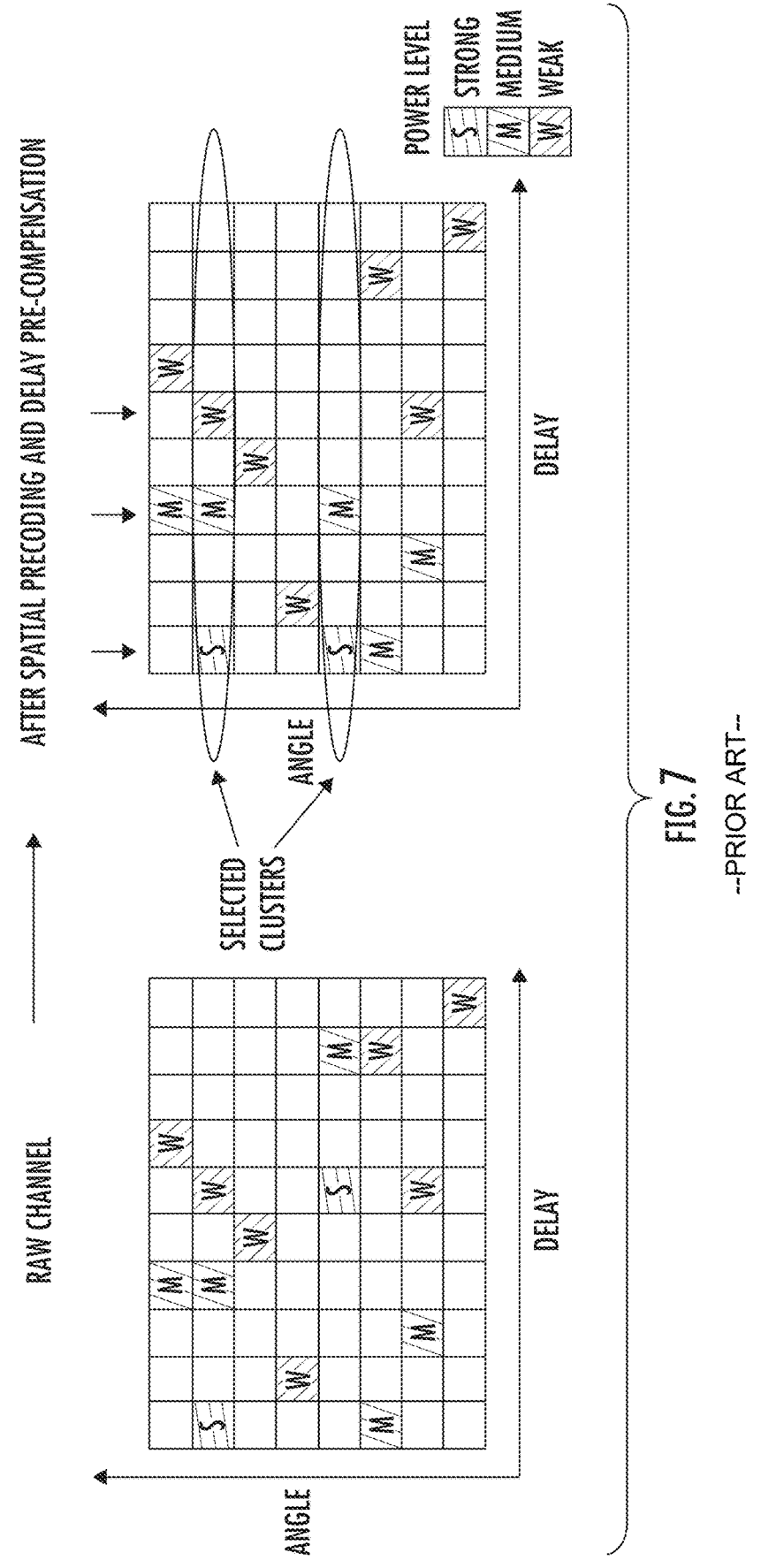
FIG. 7 illustrates angle-delay power spectrum before and after spatial precoding and delay pre-compensation.

Before describing in detail example embodiments, it is noted that the embodiments reside primarily in combinations of apparatus components and processing steps related to reducing overhead of New Radio (NR) Type II channel state information (CSI) feedback using angle and delay reciprocity. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/ multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide for reducing overhead of New Radio (NR) Type II channel state information (CSI) feedback using angle and delay reciprocity.

Figure 8:
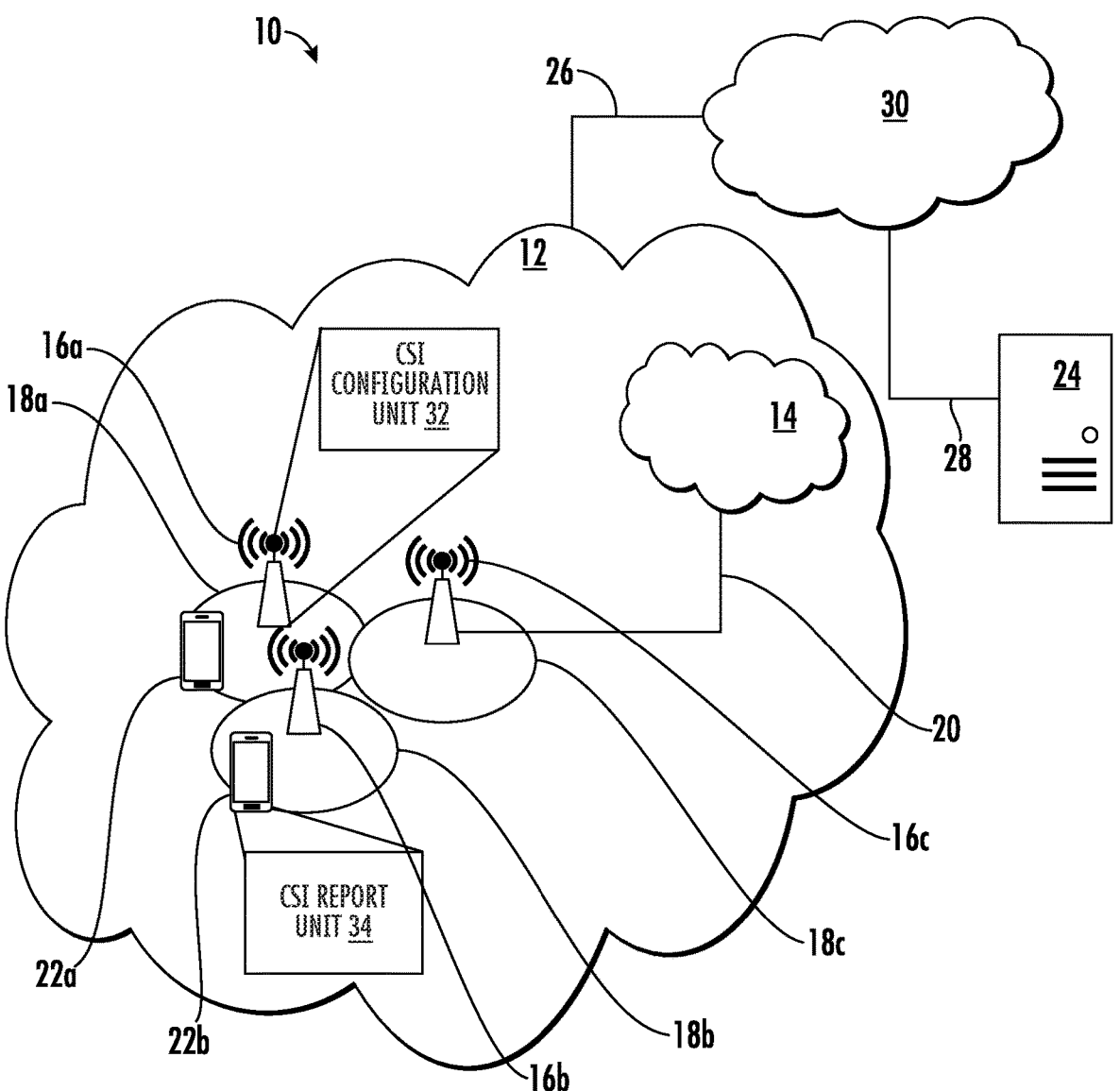
FIG. 8 is a schematic diagram of an example network architecture illustrating a communication system connected via an intermediate network to a host computer according to the principles in the present disclosure.

Referring again to the drawing figures, in which like elements are referred to by like reference numerals, there is shown in FIG. 8 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 8 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a CSI configuration unit 32 which is configured to configure a WD 22 with a CSI report setting, the CSI report setting including at least one of: a CSI-RS, resource with $N_{CSI-RS}$ CSI-RS ports for channel measurement, each of the $N_{CSI-RS}$ ports being associated with a pair of SD and FD vectors; a first subset of length $N_3$ frequency domain, FD, basis vectors of a discrete Fourier transform, the first subset comprising N basis vectors, one of which is a direct current, DC, basis vector containing all ones, where $1<=N<=N_3$; and a number M of FD basis vectors of a second subset of M FD basis vectors, the second subset being determined by the WD 22 from the first subset of FD basis vectors, one of the M FD basis vectors being the DC basis vector, where M<=N; and transmitting a CSI-RS to the WD 22. A wireless device 22 is configured to include a CSI report unit 34 which is configured to receive a CSI report setting configuration and measure CSI based on the CSI report setting.

Example implementations, in accordance with an embodiment, of the WD 22, network node 16 and host computer 24 discussed in the preceding paragraphs will now be described with reference to FIG. 9. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include a CSI configuration unit 32 which is configured to configure a WD 22 with a CSI report setting.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a CSI report unit 34 which is configured receive a CSI report setting and measure CSI based on the CSI report setting.

Figure 9:
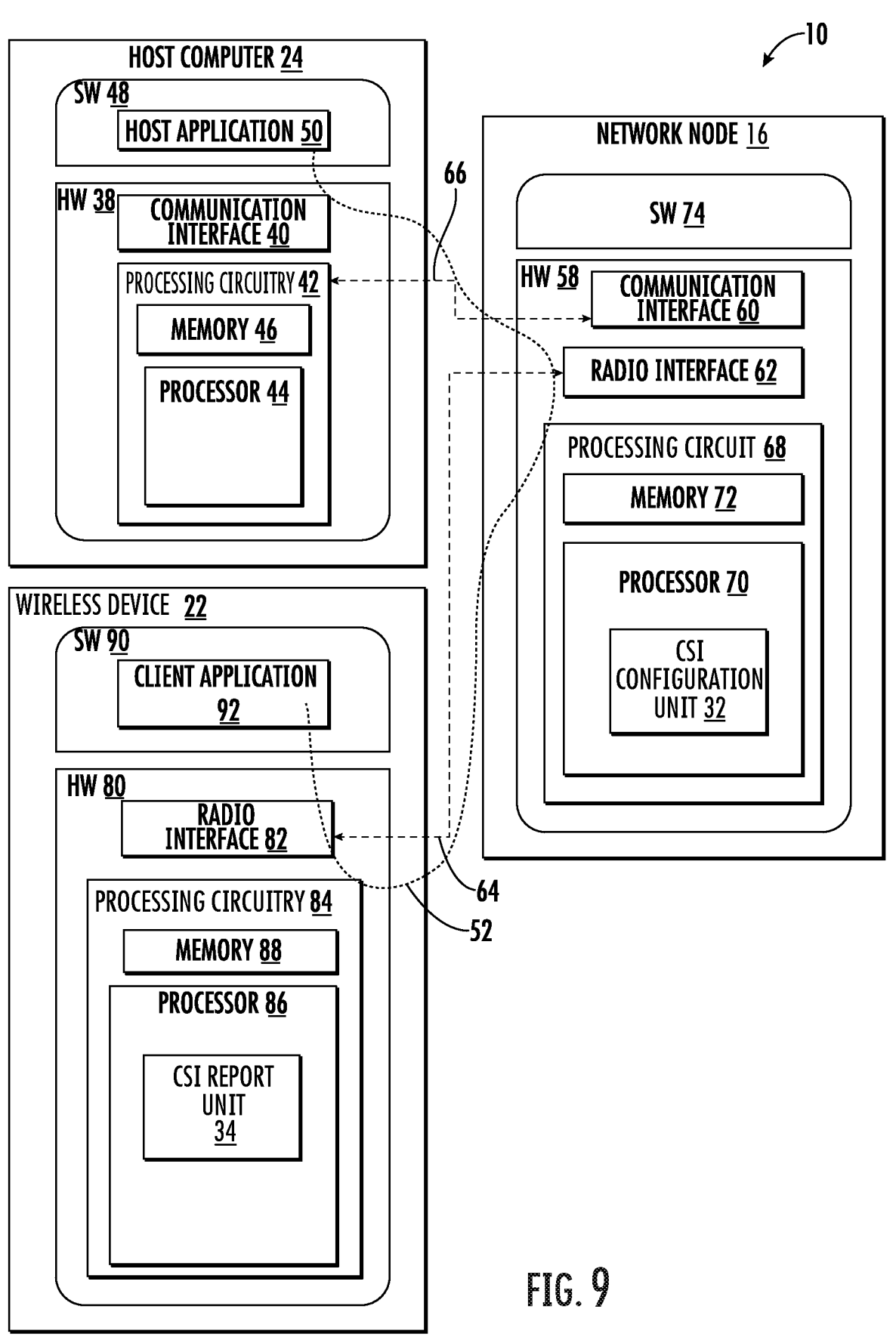
FIG. 9 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 9 and independently, the surrounding network topology may be that of FIG. 8.

In FIG. 9, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 8 and 9 show various "units" such as CSI configuration unit 32, and CSI report unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

According to one aspect, a network node 16 is configured to communicate with a wireless device, WD. The network node 16 includes processing circuitry 68 configured to configure the WD with a channel state information, CSI, report setting, the CSI report setting including at least one of: a CSI reference signal, CSI-RS, resource with $N_{CSI-RS}$ CSI-RS ports for channel measurement, each of the $N_{CSI-RS}$ ports being associated with a pair of spatial domain, SD, and frequency domain, FD, vectors; a first subset of length $N_3$ frequency domain, FD, basis vectors of a discrete Fourier transform, the first subset comprising N basis vectors, one of which is a direct current, DC, basis vector containing all ones, where $1<=N<=N_3$; and a number M of FD basis vectors of a second subset of M FD basis vectors, the second subset being determined by the WD from the first subset of FD basis vectors, one of the M FD basis vectors being the DC basis vector, where $M<=N$. The network node 16 also includes a radio interface 62 in communication with the processing circuitry 68 and configured to: transmit a CSI-RS to the WD; request the WD to feedback a CSI based on a CSI-RS and according to the CSI report setting; and receive from the WD a CSI report comprising at least one of: an indication of a number of transmission layers; an indication of a selection by the WD of a subset of the $N_{CSI-RS}$ CSI-RS ports; an indication of a selection by the WD of M FD basis vectors out of the N FD basis vectors; an indication of a set of linear combination coefficients associated with the selected subset of the CSI-RS ports and the selected M frequency domain basis vectors per transmission layer; and an indication of a total number of non-zero linear combination coefficients associated with all the M frequency domain basis vectors.

According to this aspect, in some embodiments, the radio interface 62 is further configured to receive a non-zero coefficient, NZC, bitmap, for each transmission layer, wherein each bit in the bitmap is associated with one of the selected CSI-RS ports and one of the M FD basis vectors. In some embodiments, the radio interface 62 is configured to receive from the WD an indication of a selection by the WD of the M frequency domain basis vectors only when N is greater than one and M is less than N.

According to yet another aspect, a wireless device, WD, configured to communicate with a network node 16 includes: processing circuitry 84 configured to: receive a configuration of a channel state information, CSI, report setting, the CSI report setting including at least one of: a CSI reference signal, CSI-RS, resource with $N_{CSI-RS}$ CSI-RS ports for channel measurement, each of the $N_{CSI-RS}$ ports being associated with a pair of spatial domain, SD, and frequency domain, FD, vectors; a first subset of length $N_3$ frequency domain, FD, basis vectors of a discrete Fourier transform, the first subset including N basis vectors, one of which is a direct current, DC, basis vector containing all ones, where $1<=N<=N_3$; and a number M of a second subset of M FD basis vectors, the second subset being determined by the WD from the first subset of FD basis vectors, one of the M FD basis vectors being the DC basis vector, where $<=N$; measure CSI based on the $N_{CSI-RS}$ CSI-RS ports and according to the CSI report setting, the measuring including at least one of: selecting M FD basis vectors out of the N frequency domain basis vectors; selecting a subset of CSI-RS ports out of the $N_{CSI-RS}$ CSI-RS ports; determining a set of linear combination coefficients corresponding to the selected M frequency domain basis vectors and the selected subset of CSI-RS ports. The WD also includes a radio interface 82 in communication with the processing circuitry and configured to transmit a CSI report message comprising at least one of the following: an indication of the selected M frequency domain basis vectors; an indication of the selected subset of CSI-RS ports; an indication of the set of linear combination coefficients; and an indication of a total number of non-zero linear combination coefficients associated with all the selected M FD basis vectors.

According to this aspect, in some embodiments, the processing circuitry (84) is further configured to choose $N_{p,sel}/2$ pairs of vectors that are common to two polarizations out of a total of $N_p N_{CSI-RS}/2$ pairs of vectors using at most $$\left\lceil \log_2\left(\binom{N_p N_{CSIRS}/2}{N_{p,sel}/2}\right)\right\rceil \text{bits}$$

to report for each transmission layer, wherein $N_{p,sel}$ is a total number of ports to be selected for both polarizations, and $N_p=1$. In some embodiments, when $N=1$, the first subset of frequency domain basis vectors is a set containing only the DC frequency domain basis vector. In some embodiments, the radio interface 82 is configured to transmit an indication of a selection of the selected M frequency domain basis vectors only when $M \neq N$ and M is greater than one. In some embodiments, the processing circuitry 84 is further configured to select a second subset of frequency domain basis vectors for frequency domain channel compression. In some embodiments, the selected M frequency domain basis vectors is common for all transmission layers.

In some embodiments, a network node 16 is configured to communicate with a wireless device (WD), the network node 16 has: processing circuitry 68 configured to perform at least one of: configure the WD 22 a number M of frequency domain basis vectors of a discrete Fourier transform; associate each of $NCSI_{RS}$ channel state information reference signal, CSI-RS, ports with $N_p$ pairs of vectors in a spatial domain and a frequency domain; transmit the association to the WD 22. The network node 16 also includes a radio interface 62 configured to: receive from the WD 22 at least one of: an indication of a selection by the WD 22 of a subset of the $N_{CSI-RS}$; an indication of a selection by the WD 22 of a subset of pairs of vectors in the spatial domain and the frequency domain; an indication of a selection by the WD 22 of a subset of the M frequency domain basis vectors; an indication of a set of linear combination coefficients associated with the selected subset of the CSI-RS ports and the corresponding selected frequency domain basis vectors; an indication of a set of linear combination coefficients associated with the selected subset of pairs of vectors and the corresponding selected frequency domain basis vectors; and an indication of the total number of non-zero linear combination coefficients associated with non-DC frequency domain basis vectors in the selected subset of frequency domain basis vectors, or an indication of the total number of non-zero linear combination coefficients associated with all frequency domain basis vectors in the selected subset of frequency domain basis vectors.

According to this aspect, in some embodiments, the network node 16, the radio interface 62 is further configured to perform at least one of: receive a non-zero coefficient, NZC, bitmap; receive information bits indicating location of strongest coefficient; receive information bits indicating the number of NZCs. The processing circuitry 68 may further be configured to determine at least one of the selected pairs of vectors and the selected CSI-RS ports based at least in part on the NZC bitmap; determine the NZC bitmap associated with all selected frequency domain basis vectors based on the received NZC; determine the location of the strongest coefficient based on the received information bits indicating location of strongest coefficient; and determine the total number of NZCs based on the received information bits indicating the number of NZCs. In some embodiments, the radio interface 62 is further configured to receive a non-zero coefficient, NZC, bitmap, and the processing circuitry 68 is further configured to determine at least one pair of vectors of the selected pairs of vectors and at least one CSI-RS port of the selected CSI-RS based at least in part on the NZC bitmap. In some embodiments, the NZC bitmap is associated with a DC frequency domain basis vector. In some embodiments, a NZC bitmap associated with a DC frequency domain basis vector is jointly encoded with an NZC bitmap associated with non-DC frequency domain basis vectors. In some embodiments, the NZC bitmap is associated with non-DC frequency domain basis vectors. In some embodiments, the NZC bitmap associated DC frequency domain basis vector is treated as all ones, and the NZC bitmap associated with all frequency domain basis vectors is obtained by aggregating the NZC bitmap for non-DC frequency domain basis vectors and the bitmap for the associated DC frequency domain basis vector. In some embodiments, a location of a strongest linear combination coefficient for all frequency domain basis vectors of a transmission layer is indicated by a location of a strongest linear combination coefficient of the DC frequency domain basis vectors. In some embodiments, wherein the information bits indicating the number of NZCs correspond to the number of NZCs associated with the selected non-DC frequency domain basis vectors. In some embodiments, the total number of NZCs associated with all selected frequency domain basis vectors is determined by summing the received number of NZCs and the number of selected CSI-RS ports or pairs of vectors. In some embodiments, the radio interface 62 is configured to receive from the WD an indication of a selection by the WD of a subset of the M frequency domain basis vectors only when M is greater than one and the number of frequency domain basis vectors in the subset of the M frequency domain basis vectors is less than M.

According to another aspect, a wireless device (WD) 22 is configured to communicate with a network node 16. The WD 22 comprises processing circuitry 84 configured to perform at least one of: select a first subset of frequency domain basis vectors out of a total number M of frequency domain basis vectors of a discrete Fourier transform; select a subset of CSI-RS ports out of a total number $N_{CSI-RS}$ of CSI-RS ports, each port being associated with $N_p \geq 1$ pairs of vectors in the spatial domain and the frequency domain; select a subset of pairs of vectors in the spatial domain and the frequency domain across $N_{CSI-RS}$ CSI-RS ports; determine linear combination coefficients corresponding to the selected first subset of frequency domain basis vectors and the selected subset of CSI-RS ports; determine linear combination coefficients corresponding to the selected first set of frequency domain basis vectors and the selected subset of pairs of vectors in the spatial domain and the frequency domain. The WD 22 also includes a radio interface 82 configured to transmit a CSI report message comprising at least one of the following: an indication of the selected first subset of frequency domain basis vectors; an indication of the selected subset of CSI-RS ports; an indication of the selected subset of pairs of vectors in the spatial domain and the frequency domain; an indication of the corresponding linear combination coefficients; and an indication of the total number of non-zero linear combination coefficients associated with non-DC frequency domain basis vectors in the selected first subset of frequency domain basis vectors, or an indication of the total number of non-zero linear combination coefficients associated with all frequency domain basis vectors in the selected first subset of frequency domain basis vectors.

According to this aspect, in some embodiments, the subset of CSI-RS ports and the subset of pairs of vectors are jointly selected and reported. In some embodiments, the processing circuitry 84 is further configured to make a polarization-specific selection of a subset of $N_{p,sel}$ pairs of vectors out of a total of $N_p N_{CSI-RS}$ pairs of vectors using at most $$\left\lceil \log_2\left(\binom{N_p N_{CSIRS}}{N_{p,sel}}\right)\right\rceil \text{bits}$$

to report. In some embodiments, the processing circuitry 84 is further configured to choose a subset of $N_{p,sel}/2$ pairs of vectors that are common to two polarizations out of a total of $N_p N_{CSI-RS}/2$ pairs of vectors using at most $$\left\lceil \log_2\left(\binom{N_p N_{CSIRS}/2}{N_{p,sel}/2}\right)\right\rceil \text{bits}$$

to report. In some embodiments, the processing circuitry 84 is further configured to make a polarization-specific selection of a subset of $N_{p,sel}$ pairs of vectors out of a total of $N_p N_{CSI-RS}$ pairs of vectors using at most $$v\left\lceil \log_2\left(\binom{N_p N_{CSIRS}}{N_{p,sel}}\right)\right\rceil \text{bits}$$

to report, where v is a total number of transmission layers. In some embodiments, the processing circuitry 84 is further configured to choose a subset of $N_{p,sel}/2$ pairs of vectors that are common to two polarizations out of a total of $N_p N_{CSI-RS}/2$ pairs of vectors using at most $$v\left\lceil \log_2\left(\binom{N_p N_{CSIRS}/2}{N_{p,sel}/2}\right)\right\rceil \text{bits}$$

to report, where v is a total number of transmission layers. In some embodiments, an indication for the selected subset of CSI-RS ports or for the selected subset of pairs of vectors are jointly encoded and reported with an indication for the corresponding non-zero coefficients (NZCs). In some embodiments, the reported NZC bitmap is only associated with non-DC frequency domain basis vectors. In some embodiments, the selected subset of pairs of vectors are indicated by a non-zero coefficient (NZC) bitmap that indicates non-zero linear combination coefficients corresponding to the selected pairs. In some embodiments, a NZC bitmap associated with a DC frequency domain basis vector is jointly encoded with a NZC bitmap associated with non-DC frequency domain basis vectors. In some embodiments, a location of a strongest linear combination coefficient associated with all frequency domain basis vectors of a transmission layer is indicated by a location of a strongest linear combination coefficient associated with the DC frequency domain basis vector. In some embodiments, the total number of NZCs associated with non-DC frequency domain basis vectors are reported. In some embodiments, when M=1, the selected first subset of frequency domain basis vectors is a set containing only the DC frequency domain basis vector. In some embodiments, the radio interface 82 is configured to transmit an indication of a selection of the selected first subset of frequency domain basis vectors only when M is greater than one and the number of frequency domain basis vectors in the selected first subset of frequency domain basis vectors is less than M. In some embodiments, when M is equal to 2 and a number of frequency domain basis vectors in the selected first subset of frequency domain basis vectors is equal to two, then an indication of the selected subset of frequency domain basis vectors is not transmitted. In some embodiments, the processing circuitry 84 is further configured to select a second subset of frequency domain basis vectors for frequency domain channel compression. In some embodiments, the selected first subset of frequency domain basis vectors is common for all transmission layers.

Figures 10, 11:
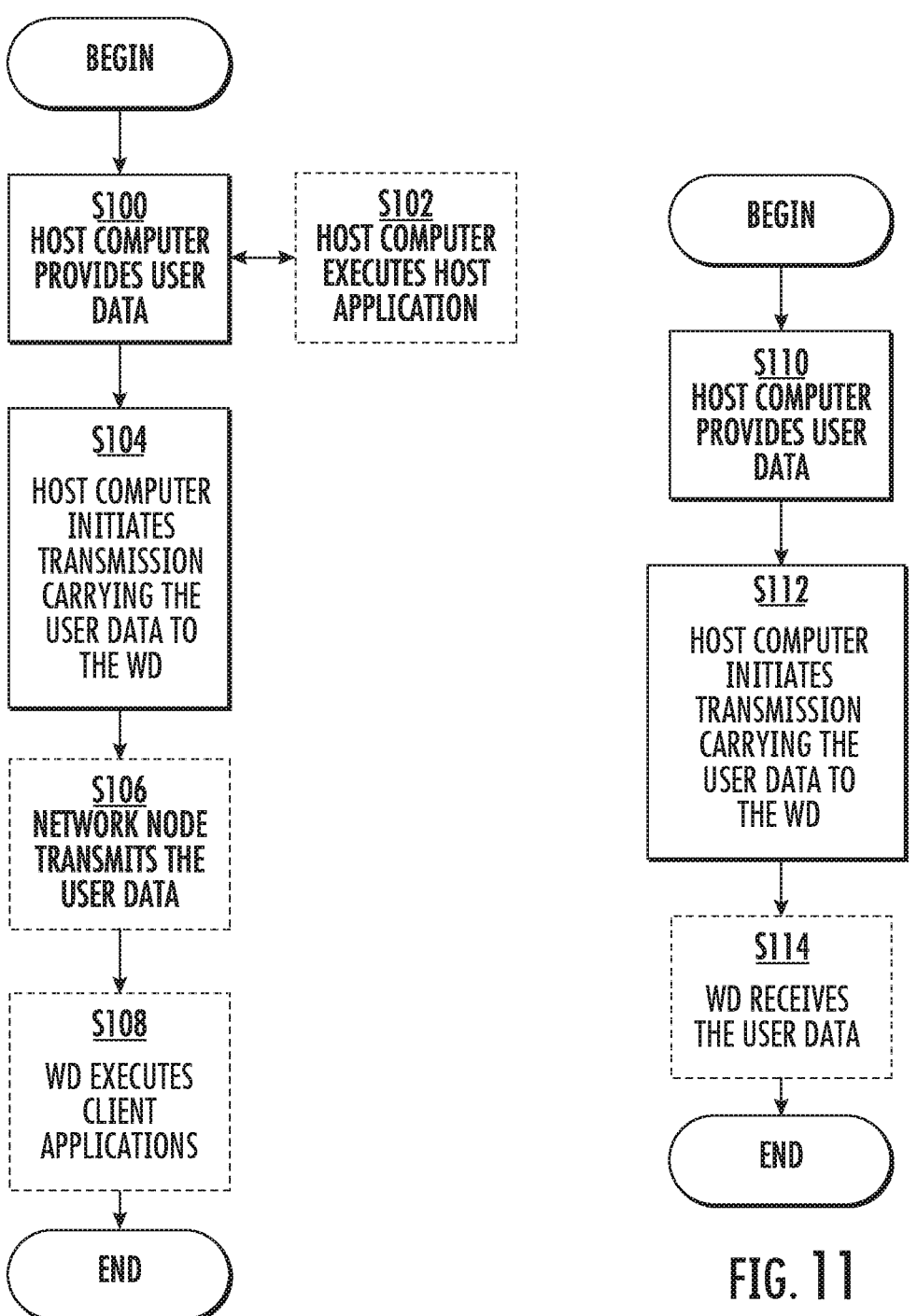
FIG. 10 is a flowchart illustrating example methods implemented in a communication system including a host computer, a network node and a wireless device for executing a client application at a wireless device according to some embodiments of the present disclosure.
FIG. 11 is a flowchart illustrating example methods implemented in a communication system including a host computer, a network node and a wireless device for receiving user data at a wireless device according to some embodiments of the present disclosure.

FIG. 10 is a flowchart illustrating an example method implemented in a communication system, such as, for example, the communication system of FIGS. 8 and 9, in accordance with one embodiment. The communication system may include a host computer 24, a network node 16 and a WD 22, which may be those described with reference to FIG. 9. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 11 is a flowchart illustrating an example method implemented in a communication system, such as, for example, the communication system of FIG. 8, in accordance with one embodiment. The communication system may include a host computer 24, a network node 16 and a WD 22, which may be those described with reference to FIGS. 8 and 9. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 12, 13:
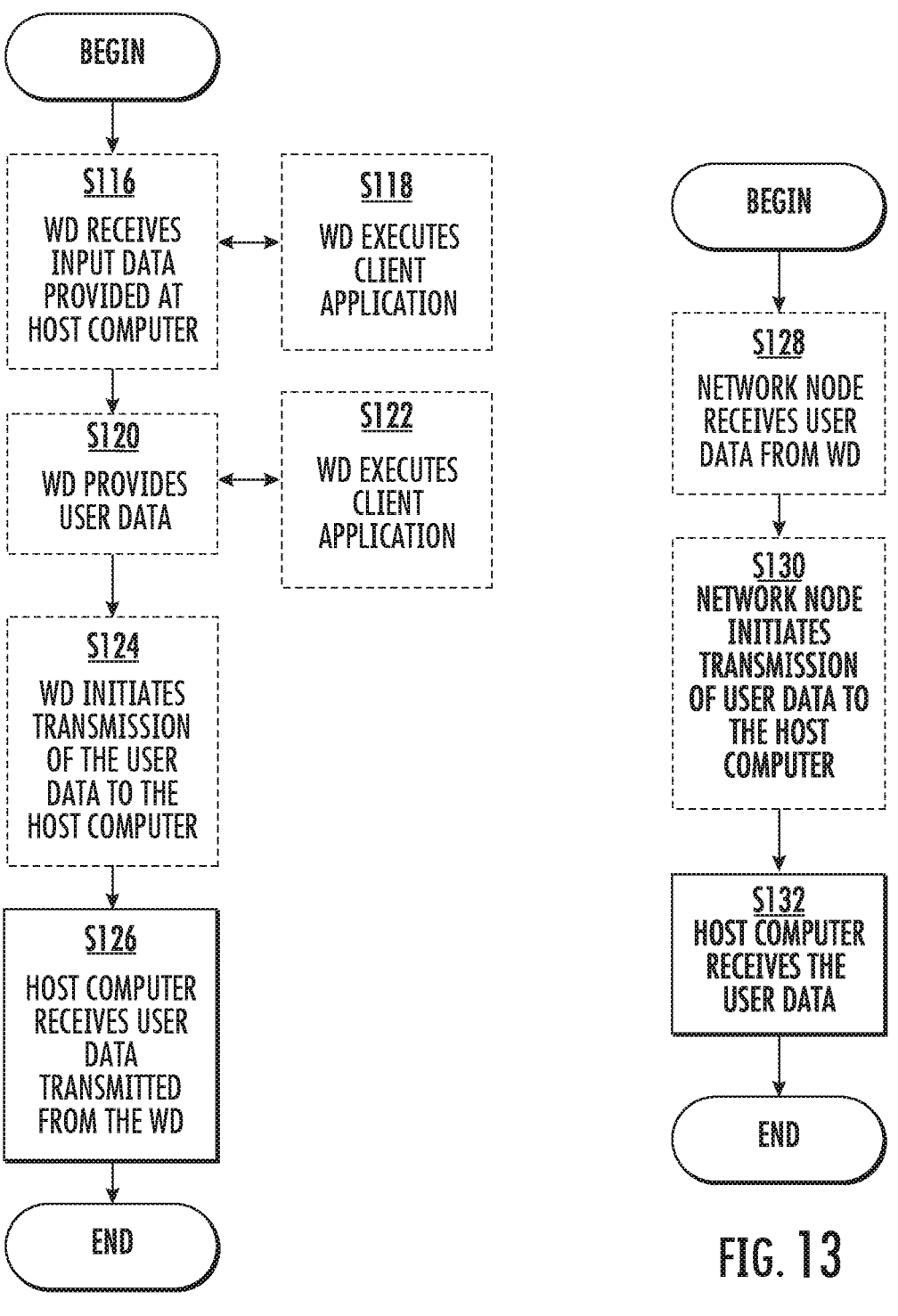
FIG. 12 is a flowchart illustrating example methods implemented in a communication system including a host computer, a network node and a wireless device for receiving user data from the wireless device at a host computer according to some embodiments of the present disclosure.
FIG. 13 is a flowchart illustrating example methods implemented in a communication system including a host computer, a network node and a wireless device for receiving user data at a host computer according to some embodiments of the present disclosure.

FIG. 12 is a flowchart illustrating an example method implemented in a communication system, such as, for example, the communication system of FIG. 8, in accordance with one embodiment. The communication system may include a host computer 24, a network node 16 and a WD 22, which may be those described with reference to FIGS. 8 and 9. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 13 is a flowchart illustrating an example method implemented in a communication system, such as, for example, the communication system of FIG. 8, in accordance with one embodiment. The communication system may include a host computer 24, a network node 16 and a WD 22, which may be those described with reference to FIGS. 8 and 9. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

FIG. 14 is a flowchart of an example process in a network node 16 for reducing overhead of New Radio (NR) Type II channel state information (CSI) feedback using angle and delay reciprocity. One or more blocks described herein may be performed by one or more elements of network node 16 such as by one or more of processing circuitry 68 (including the CSI configuration unit 32), processor 70, radio interface 62 and/or communication interface 60. Network node 16 such as via processing circuitry 68 and/or processor 70 and/or radio interface 62 and/or communication interface 60 is configured to perform at least one of steps in Blocks S134, S136, S138 and 140. The process may include configuring the WD 22 with a channel state information, CSI, report setting, the CSI report setting including at least one of (Block S134): a CSI reference signal, CSI-RS, resource with $N_{CSI-RS}$ CSI-RS ports for channel measurement, each of the $N_{CSI-RS}$ ports being associated with a pair of spatial domain, SD, and frequency domain, FD, vectors (Block S136); a first subset of length $N_3$ frequency domain, FD, basis vectors of a discrete Fourier transform, the first subset comprising N basis vectors, one of which is a direct current, DC, basis vector containing all ones, where $1<=N<=N_3$ (Block S138); and a number M of FD basis vectors of a second subset of M FD basis vectors, the second subset being determined by the WD 22 from the first subset of FD basis vectors, one of the M FD basis vectors being the DC basis vector, where $M<=N$ (Block S140); and transmitting a CSI-RS to the WD 22; requesting the WD to feedback a CSI based on a CSI-RS and according to the CSI report setting (Block S144); receiving from the WD 22 a CSI report comprising at least one of (Block S146): an indication of a number of transmission layers (Block S148); an indication of a selection by the WD 22 of a subset of the $N_{CSI\text{-}RS}$ CSI-RS ports (Block S150); an indication of a selection by the WD 22 of M FD basis vectors out of the N FD basis vectors (Block S152); an indication of a set of linear combination coefficients associated with the selected subset of the CSI-RS ports and the selected M frequency domain basis vectors per transmission layer (Block S154); and an indication of a total number of non-zero linear combination coefficients associated with all the M frequency domain basis vectors (Block S156).

In some embodiments, the method includes receiving a non-zero coefficient, NZC, bitmap, for each transmission layer, wherein each bit in the bitmap is associated with one of the selected CSI-RS ports and one of the M FD basis vectors. In some embodiments, the method also includes receiving from the WD 22 an indication of a selection by the WD 22 of the M frequency domain basis vectors only when N is greater than one and M is less than N.

FIG. 15 is a flowchart of an example process in a wireless device 22 according to some embodiments of the present disclosure. One or more blocks described herein may be performed by one or more elements of wireless device 22 such as by one or more of processing circuitry 84 (including the CSI report unit 34), processor 86, radio interface 82 and/or communication interface 60. Wireless device 22 such as via processing circuitry 84 and/or processor 86 and/or radio interface 82 is configured to perform at least one of steps in Blocks S154, S156, S158, S160, S162 and 164. The process includes: receiving a configuration of a channel state information, CSI, report setting, the CSI report setting including at least one of (Block S158): a CSI reference signal, CSI-RS, resource with $N_{CSI\text{-}RS}$ CSI-RS ports for channel measurement, each of the $N_{CSI\text{-}RS}$ ports being associated with a pair of spatial domain, SD, and frequency domain, FD, vectors (Block S160); a first subset of length $N_3$ frequency domain, FD, basis vectors of a discrete Fourier transform, the first subset including N basis vectors, one of which is a direct current, DC, basis vector containing all ones, where $1<=N<=N_3$ (Block S162); and a number M of a second subset of M FD basis vectors, the second subset being determined by the WD 22 from the first subset of FD basis vectors, one of the M FD basis vectors being the DC basis vector, where $<=N$ (Block S164); and measuring CSI based on the $N_{CSI\text{-}RS}$ CSI-RS ports and according to the CSI report setting, the measuring including at least one of (Block S166): selecting M FD basis vectors out of the N frequency domain basis vectors (Block S168); selecting a subset of CSI-RS ports out of the $N_{CSI\text{-}RS}$ CSI-RS ports (Block S170); determining a set of linear combination coefficients corresponding to the selected M frequency domain basis vectors and the selected subset of CSI-RS ports (Block S172); and transmitting a CSI report message comprising at least one of the following (Block S174): an indication of the selected M frequency domain basis vectors (Block S176); an indication of the selected subset of CSI-RS ports (Block S178); an indication of the set of linear combination coefficients (Block S180); and an indication of a total number of non-zero linear combination coefficients associated with all the selected M FD basis vectors (Block S182).

According to this aspect, in some embodiments, the method also includes choosing $N_{p,sel}/2$ pairs of vectors that are common to two polarizations out of a total of $N_p N_{CSI\text{-}RS}/2$ pairs of vectors using at most $$v\left\lceil \log_2\left(\binom{N_p N_{CSIRS}/2}{N_{p,sel}/2}\right)\right\rceil \text{ bits}$$

to report for each transmission layer, wherein $N_{p,sel}$ is a total number of ports to be selected for both polarizations, and $N_p=1$. In some embodiments, when N=1, the first subset of frequency domain basis vectors is a set containing only the DC frequency domain basis vector. In some embodiments, the method also includes transmitting an indication of a selection of the selected M frequency domain basis vectors only when M #N and M is greater than one. In some embodiments, the method also includes selecting a second subset of frequency domain basis vectors for frequency domain channel compression. In some embodiments, the selected M frequency domain basis vectors is common for all transmission layers.

Having described the general process flow of arrangements of the disclosure and having provided examples of hardware and software arrangements for implementing the processes and functions of the disclosure, the sections below provide details and examples of arrangements for reducing overhead of New Radio (NR) Type II channel state information (CSI) feedback using angle and delay reciprocity.

CSI-RS Transmission for CSI Feedback

Figure 16:
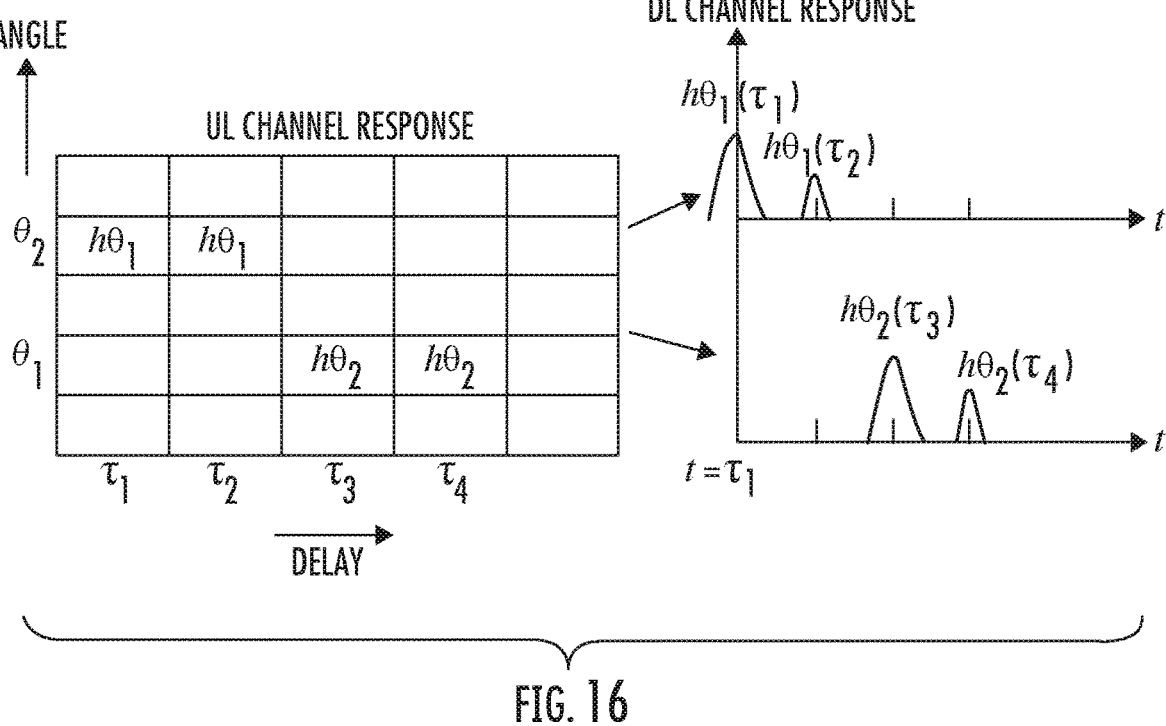
FIG. 16 illustrates an example of channel delays and angles of arrival measured on the uplink (UL)

FIG. 16 is an example of UL channel observed at the network node 16 for a WD 22, where there are two channel delays associated with each one of two spatial directions, i.e., $(\tau_1, \tau_2)$ at $\theta_1$ and $(\tau_3, \tau_4)$ at $\theta_2$. It is assumed that the angles and delays observed in the UL are the same as in the DL, but the actual channel response in the DL, $\{h_{\theta_1}(\tau_1), h_{\theta_1}(\tau_2), h_{\theta_2}(\tau_3), h_{\theta_2}(\tau_4)\}$, may be different from the ones observed in the UL and thus, need to be measured by the WD 22 as part of CSI computation.

Transmission of CSI-RS in SD-FD Pairs

Figure 17:
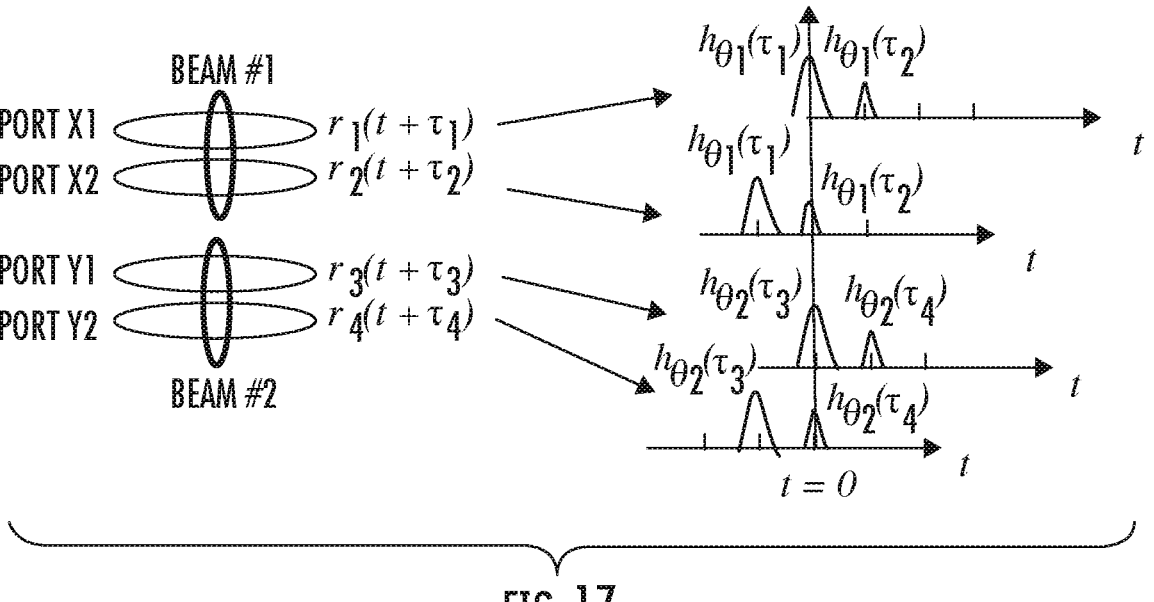
FIG. 17 illustrates an example of delay pre-compensated CSI-RS transmission.

In the above example, for CSI feedback the network node 16 may transmit CSI-RS over four CSI-RS ports with delay pre-compensated as shown in FIG. 17. Each of the four ports is associated with a spatial beam and a time delay. A time advance is applied to each port to pre-compensate a particular channel delay. The time advance is equivalent to a frequency dependent phase shift, $e^{j2\pi f\tau_k}$, in the frequency domain. Thus, each port is also referred to as a spatial domain (SD) and frequency domain (FD) pair, or SD-FD pair.

Note that ports x1 and x2 are associated with a first beam, and ports y1 and y2 are associated with a second beam. Ports x1 and x2 may share a same CSI-RS resource for a single CSI-RS port by dividing the resource into two sub-resources, each occupying half of the resource (e.g., in different PRBs) and used for carrying one of ports x1 and x2. Similarly, ports y1 and y2 may share a CSI-RS resource for a single CSI-RS port. Alternatively, each of the four ports may be configured with a separate single CSI-RS port resource.

The perceived DL channel for each CSI-RS port at the WD 22 (after self-correlation of the received signal from port k with $r_k(t)$, k=1,2,3,4) is shifted in time such that the original channel responses associated with different delays are aligned at t=0.

As used herein, a 'frequency domain basis vector' (FD basis vector) may be defined as a set of orthogonal complex vectors (e.g., DFT vectors) with length equal to $N_3$. For instance, in 3GPP specifications, the $n^{th}$ frequency domain basis vector, where n={0, 1, . . . , $N_3$−1}, may be defined as follows:

$$f_n = \begin{bmatrix} e^{j2\pi \cdot 0 \cdot n/N_3} \\ e^{j2\pi \cdot 1 \cdot n/N_3} \\ \vdots \\ e^{j2\pi \cdot (N_3-1) \cdot n/N_3} \end{bmatrix}$$

Note that in some cases, the notation $f_{n,l}$ may be used to denote the $n^{th}$ frequency domain basis vector associated with the precoding matrix corresponding to the $l^{th}$ spatial layer as different layers may be associated with different FD basis vectors.

CSI Calculation:

For PMI calculation, the WD 22 may assume a flat channel associated with each SD-FD pair and thus only the channel response components around t=0 may be filtered out and used, i.e., $\hat{H}(f)=[h_{\theta_1}(\tau_1),h_{\theta_2}(\tau_2),h_{\theta_2}(\tau_3),h_{\theta_2}(\tau_4)]$ in the above example. In this case, $\hat{H}(f)$ is a frequency flat channel. It is equivalent to use a single FD basis of $f_{n=0}$ for PMI calculation in 3GPP Rel-16 Type II codebook, i.e., $W_{f,l}=f_{n=0}$.

For rank and CQI calculation, the unfiltered channel responses are used, i.e., $H(f)=[h_{\theta_1}(\tau_1)+h_{\theta_1}(\tau_2)e^{j2\pi f(\tau_1-\tau_2)},h_{\theta_1}(\tau_1)e^{-j2\pi f(\tau_1-\tau_2)}+h_{\theta_1}(\tau_2),h_{\theta_2}(\tau_3)+h_{\theta_2}(\tau_4)e^{j2\pi f(\tau_3-\tau_4)},h_{\theta_2}(\tau_3)e^{-j2\pi f(\tau_3-\tau_4)}+h_{\theta_2}(\tau_4)]$ in the above example. For a WD 22 with multiple receive antennas, $h_{\theta_k}(\tau)$, k=1, 2, is a column vector.

CSI-RS Transmissions with Delay Pre-Compensation

Figure 18:
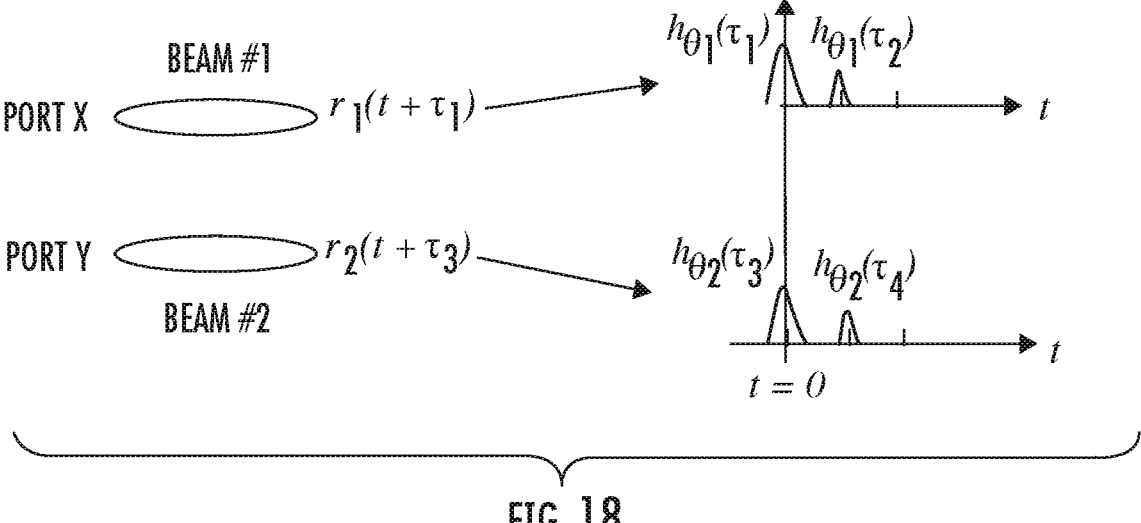
FIG. 18 illustrates another example of delay pre-compensated CSI-RS transmission.

Alternatively, the network node 16 may transmit CSI-RS over two CSI-RS ports with one channel delay pre-compensated per port as shown in FIG. 18. In this case, not all channel delays are pre-compensated. The perceived DL channel for each CSI-RS port at the WD 22 (after self-correlation of the received signal from port k with $r_k(t)$, k=1, 2.) is shifted in time such that the first channel responses at the two spatial directions are aligned at t=0. In this case, the unfiltered channel responses, i.e., $H(f)=[h_{\theta_1}(\tau_1)+h_{\theta_1}(\tau_2)e^{j2\pi f(\tau_1-\tau_2)}, h_{\theta_2}(\tau_3)+h_{\theta_2}(\tau_4)e^{j2\pi f(\tau_3-\tau_4)}]$ in the example, are used for PMI, rank and CQI calculations.

Enhanced Type II Port Selection Codebook for CSI Feedback

In 3GPP Rel-16, the eType II CSI report contains information of the selected SD and FD basis vectors and the corresponding linear combination coefficients (LCCs) for combining them. By using angle and delay reciprocity, the spatial domain and time domain properties of the channel (angles and delays to clusters, for example) can be included in the CSI-RS precoding. By doing so, fewer FD basis vectors are needed and, in some embodiments, a single FD basis vector with the corresponding wideband coefficient can represent the channel (if the channel is frequency-flat). This leads to a reduction in the reporting overhead associated with the selected FD basis vectors, both for indicating the selected FD basis vectors and for reporting the coefficients for combining the selected SD and FD basis vectors, as compared with other arrangements. Based on the above CSI-RS precoding method, some embodiments provide a framework for reducing WD 22 reporting overhead compared to the 3GPP Rel-16 eType II port-selection codebook (CB).

FIG. 19 shows an example flow chart of the steps involved in some embodiments of NR Type II port selection CSI feedback having reduced overhead compared to previous NR Type II port selection feedback schemes in the 3GPP standards. In some embodiments, only some of the Steps 1-5 are performed by WD 22. In some of these embodiments, results associated with steps not performed by the WD 22 are either performed elsewhere and derived and/or obtained by the WD 22 in a different manner, or they may be replaced by alternate steps.

In the first step (Step 1), the WD 22 receives a CSI-RS configuration from the network node wherein the CSI-RS configuration involves a CSI-RS resource for channel measurement with $N_{CSIRS}$ CSI-RS ports.

One difference from CSI-RS configurations used for 3GPP Rel-16 type II port selection codebooks is that the WD 22 is configured to assume that each CSI-RS port is associated with one or multiple SD-FD pairs (i.e., the number of SD-FD basis pairs for CSI-RS port p is configured by the network to the WD 22 as the value $N_p \geq 1$). It is also possible that a single value $N_p$ is configured and applied to all ports of the CSI-RS resource.

The value $N_p$ can be configured to the WD 22 by the network per CSI report setting. As the WD 22 can be configured with multiple CSI report settings, it is possible for the network to dynamically change the value of $N_p$ from one requested measurement to another, based on which report setting is triggered. Alternatively, the value $N_p$ is configured per CSI-RS resource setting.

A benefit of associating more than one SD-FD pair for each CSI-RS port may be that it reduces the CSI-RS overhead per SD-FD pair. This may be useful when WD-specific CSI-RS (i.e., precoded for each WD 22 individually so that a CSI-RS cannot be shared by multiple WDs) is used for many WDs. This means that the number of ports in a WD-specific CSI-RS resource can be reduced and it becomes easier to schedule WD-specific CSI-RS resources to many WDs in a cell.

A consequence of $N_p>1$ SD-FD pairs per port is that the MIMO precoding becomes frequency selective. That is, the precoder used for a given CSI-RS port on a first set of subcarriers is generally different than the precoder used on a second set of subcarriers, in an OFDM symbol. This means the WD 22 may not assume that the channel received on a first set of subcarriers is the same or can be inferred from the channel on the second set of subcarriers. If $N_p=2$, a first and second SD-FD pair is associated with a first and second set of subcarriers respectively.

In specifications, the first and second set of subcarriers can be defined as a first and second precoder resource group (PRG). For example (assuming $N_p=2$), subcarriers used by the CSI-RS resource in even and odd numbered resource blocks (RB) belong to the first and second PRG respectively. Hence, a first and second SD-FD pair is associated with a first and second PRG, respectively. The WD 22 can then associate one SD-FD pair with each PRG for further CSI calculations and reporting.

Alternatively, it may be specified for operation in this context that $N_p$ sub-ports (or sub-antenna ports) are introduced for a CSI-RS resource. One CSI-RS port may therefore be configured to have $N_p$ sub-antenna ports where the resource elements in the OFDM grid used by a certain CSI-RS port (according to legacy CSI-RS definitions) are divided into subsets (such as subcarriers and/or OFDM symbols), and the CSI-RS in these resource elements define the sub-port. Therefore, the legacy CSI-RS definitions can be maintained while a 3GPP Rel-17 terminal configured for Type II port selection observes an increase of $N_p$ antenna ports compared to the legacy system. The WD 22 may then associate one SD-FD pair with each sub-port for further CSI calculations and reporting.

When more than one SD-FD pair is used per CSI-RS port, methods for selecting and reporting pairs of SD-FD basis vectors are presented herein, that are different from CSI computation and feedback in the case of a 3GPP Rel-16 type II port selection codebook. Various detailed embodiments on selection and reporting of SD-FD basis vectors involving different CSI reporting overheads are given above.

Referring again to FIG. 19, in the second step (Step 2), the WD 22 receives a configuration and/or request from the network node for CSI feedback using a Type II port selection codebook (e.g., a 3GPP Rel-17 enhanced NR type II port selection codebook). The configuration involves a CSI report configuration wherein a CSI-RS resource with $N_{CSIRS}$ CSI-RS ports and $N_p > 1$ SD-FD basis pairs per CSI-RS port is configured for channel measurement, for example, by using the sub-port definition discussed above.

In the third step (Step 3), the WD 22 is given a first subset of FD basis vectors out of $M_{tot}$ FD basis vectors. The selection of a first subset of FD basis vectors may be based on any one of the following:
- Selection is network controlled: receiving the first subset of FD basis vectors via an indication from the network node (e.g., via RRC, MAC CE or DCI signaling); and/or
- Selection is predefined: the first subset of FD basis vectors are predefined in 3GPP specifications. The first subset may be selected from several pre-defined subsets. The first subset may contain just one FD basis vector, e.g., a DC vector (i.e., a vector contains all 1's).

From the first subset of FD basis vectors, the WD 22 may further select a second subset of FD basis vectors (i.e., selection is WD 22 controlled) or use the first subset of FD basis vectors for FD channel compression.

If the WD 22 further selects a second subset of FD basis vectors, the second subset of FD basis vectors are then defined as the columns of the FD compression matrix. In case the first subset of FD basis vectors are used by the WD 22, then the first subset of FD basis vectors are used as columns of the FD compression matrix.

The first subset or the second subset of FD basis vectors has a much smaller number of FD basis vectors compared to $M_{tot}$. Since the WD 22 selects a much smaller number of FD basis vectors, the benefit here is that the overhead for indicating the selected FD basis vectors can be reduced, and the computational complexity for selecting the best FD basis vectors can also be reduced. Moreover, due to the reduced number of FD basis vectors, the number of linear combination coefficients, which is proportional to the number of FD basis vectors, can also be reduced.

In contrast, for CSI computation related to 3GPP Rel-16 type II port selection codebook, the WD 22 has to select a fixed number of FD basis vectors out of $M_{tot}$ basis vectors, which can be large for large bandwidths. This in turn may require larger feedback overhead and the selection of the FD basis vector selection is more complex. When the WD 22 determines a first subset of FD basis vectors out of $M_{tot}$ FD basis vectors, the details on how the WD 22 selects this first subset of FD basis vectors or the second subset of FD basis vectors are disclosed herein. Various detailed embodiments on the selection of the first subset or the second subset of FD basis vectors involving different CSI reporting overheads are also disclosed.

Returning again to FIG. 19, in the fourth step, Step 4, the WD 22 performs CSI computation which includes one or more of selection of a subset of CSI-RS ports (or sub-ports or PRGs), selection of one or more SD-FD pair(s), selection of a subset of FD basis vectors, and computation of corresponding linear combination coefficients.

In the fifth step, Step 5, the WD 22 reports the CSI to the network node which includes one or more of reporting the selected subset of CSI-RS ports (or sub-ports or PRGs), the selected SD-FD pair(s), the selected FD basis vectors and the corresponding linear combination coefficients. To reduce CSI reporting overhead, one or more of these components can be jointly encoded and reported. In one example, the selected subset of CSI-RS ports (or sub-ports or PRGs), the selected SD-FD pair(s) and the selected subset of FD basis vectors may be jointly encoded and reported. In yet another example, the bitmap indicating the non-zero power coefficients of the linear combination coefficients are used to implicitly indicate one or more of the selected subset of CSI-RS ports (or sub-ports or PRGs), the selected SD-FD pair(s), and the selected FD basis vector(s). Detailed embodiments are provided in the remaining sections.

Reporting of Selected Pairs of SD-FD Basis Vectors

As explained above, each CSI-RS port may contain one or multiple pairs of SD-FD basis vectors, the reporting of selected ports and the pairs of SD-FD basis vectors can be jointly encoded to reduce reporting overhead.

In one embodiment, the bits or codepoints for indicating the selected CSI-RS ports are jointly encoded with bits or codepoints for indicating the selected pairs of SD-FD basis vectors.

Different alternatives for reporting the selected pairs of SD-FD basis vectors are listed below with sub-embodiments.

Layer-Common SD-FD Basis Pair Selection

In this case, the network node 16 precodes each CSI-RS port with $N_p \geq 1$ pair(s) of SD-FD bases. Therefore, in total there are $N_{p,tot} = N_p N_{CSIRS}$ SD-FD basis pairs that are used for CSI-RS precoding. The WD 22 may measure the DL channel and may be configured to select $N_{p,sel}$ out of $N_{p,tot}$ SD-FD basis pairs and reports to these selections to the network node 16.

Selecting and Reporting a Subset of SD-FD Basis Pairs

In one embodiment, polarization-specific SD-FD basis pairs are selected by the WD 22. In this case, the WD 22 can freely select $N_{p,sel}$ out of $N_{p,tot}$ SD-FD basis pairs, which requires at most $$\left\lceil \log_2\left(\binom{N_{p,tot}}{N_{p,sel}}\right)\right\rceil \text{ bits or } \binom{N_{p,tot}}{N_{p,sel}}$$

codepoints (in case joint encoding with other information is used) to indicate the selected basis pairs.

In another embodiment, polarization-common basis pairs may be selected by the WD 22. In this case, the WD 22 can freely select $N_{p,sel}/2$ out of $N_{p,tot}/2$ SD-FD basis pairs for both polarizations, which requires at most $$\left\lceil \log_2\left(\binom{\frac{N_{p,tot}}{2}}{\frac{N_{p,sel}}{2}}\right)\right\rceil \text{ bits}$$

to indicate the selected basis pairs. In this case, if one of the $N_{p,tot}/2$ SD-FD pairs is selected, then automatically another SD-FD pair is also selected that is not among those that can be selected in the first step. So in total, $N_{p,sel}$ basis pairs are selected while the overhead is reduced compared to the polarization specific basis pair selection.

For both cases, these bits can be included in PMI information fields $X_1$ which may be conveyed via CSI report part 2 group 0, as specified, for example, in Table 6.3.2.1.2-2A from 3GPP TS 38.212 v16.0.0.

Selecting and Reporting all Pairs within a Port Once a Port is Selected

In another embodiment, if all the SD-FD basis pairs in all sub-ports or all PRGS within a port, if these are defined, within each port are selected once a port is selected, then the WD 22 may only report which CSI-RS ports are selected. In addition, if the same CSI-RS ports are selected for both polarizations, WD 22 may only report the selected ports for one polarization and the other port follows automatically by some relation between ports that are paired due to polarization. Denote the number of selected CSI-RS ports as 2L, then for polarization-common and polarization-specific port selection, at most $$\left\lceil \log_2\left(\binom{\frac{N_{CSIRS}}{2}}{L}\right)\right\rceil$$

and $$\left\lceil \log_2\left(\binom{N_{CSIRS}}{2L}\right)\right\rceil \text{bits}$$

are required, respectively, to indicate the selected pairs of SD-FD basis vectors. These bits can be included in PMI information fields $X_1$, which may be conveyed via CSI report part 2 group 0, as specified in Table 6.3.2.1.2-2A from 3GPP TS 38.212 v16.0.0.

Layer-Specific SD-FD Basis Pair Selection

In this case, CSI-RS precoding at the network node 16 is the same as in the case of layer-common SD-FD basis pair selection in described above: i.e., the network node 16 precodes each CSI-RS port with $N_p{\geq}1$ pair(s) of SD-FD basis. Therefore, in total there are $N_{p,tot}=N_pN_{CSIRS}$ SD-FD basis pairs that are used for CSI-RS precoding. The WD 22 may measure the DL channel and may be configured to select $N_{p,sel}$ out of $N_{p,tot}$ SD-FD basis pairs and report the selections to the network node 16. The difference between this example embodiments and some other example embodiments, is that WD 22 will select CSI-RS ports and the corresponding SD-FD basis pairs for each layer and report to the network node 16, which can be jointly encoded.

In some embodiments, for each transmission layer, the WD 22 reports the selected SD-FD basis pairs using the methods described above, while the required number of bits may be v (note that v represents the number of transmission layers) times the corresponding number of bits. The bits for indicating the selected SD-FD basis pairs are included in PMI information fields $X_1$ which may be conveyed via CSI report part 2 group 0, as specified in Table 6.3.2.1.2-2A from 3GPP TS 38.212 v16.0.0.

In another embodiment, WD 22 does not report the selected SD-FD basis pairs for each layer. Instead, the selected SD-FD basis pairs per layer is indicated by the non-zero coefficient bitmap for LCCs, as the selected SD-FD basis pairs have one-to-one mapping to the corresponding LCC.

WD Selecting all SD-FD Basis Pairs

In another embodiment, when the WD 22 is configured to use all the SD-FD basis pairs for PMI reporting, there is no need to report the selected pairs as all of them will be selected.

Reporting of Selected FD Basis Vectors

When delay pre-compensation is applied to CSI-RS precoding, the effective DL channel seen at the WD 22 is expected to be more frequency-flat than the DL channel without delay pre-compensation. Ideally, in the case of perfect delay pre-compensation, only a single tap is seen at the WD 22. Therefore, the WD 22 can average the channel and report only wideband LCCs. However, in more practical scenarios, delay may not be perfectly compensated at the network node 16, due to, for example, channel estimation error, calibration error, non-reciprocal fast fading etc. In such cases, the WD 22 may still see multiple taps in the DL, which may require more than one FD basis vectors to compress the channel in frequency domain, in some embodiments. However, because of delay pre-compensation, most of the channel knowledge will be captured by the first tap>The WD 22 may only need a small number of FD basis vectors to capture the residual taps. The first tap may be filtered by the DC component of the FD basis, i.e., [1, 1, . . . , 1], which is applied to the DL channel over frequency to get an FD averaged channel.

When delay is not pre-compensated at the network node 16 during CSI-RS precoding, the WD 22 also needs to select the FD basis vectors and report to the network node 16. However, when delay is not pre-compensated, the DC component may not always be selected.

Whether delay is pre-compensated or not, WD 22 should report which FD basis vectors are used.

Reporting Based on gNB Indication

The network node can indicate to the WD 22 a selected set of FD basis vectors based on UL measurements. Then, the WD 22 may select from the indicated set and report to the network node 16 the selected FD basis vectors. The indication from the network node 16 can be via radio resource control (RRC) signaling, MAC CE signaling, or via a combination of RRC and MAC CE signaling. In an alternative embodiment, the set of FD basis vectors from which the WD 22 should select the FD basis vectors to be reported to the network node 16 are predefined in specifications.

Port-Common FD Basis Selection

In some embodiments, the network node 16 can configure $M_{tot}{\geq}1$ FD basis vectors to the WD 22. The WD 22 is then configured to select and report M ($1{\leq}M{\leq}M_{tot}$) of out the $M_{tot}$ FD basis vectors. The configured FD basis vectors may be used for all $N_{CSIRS}$ CSI-RS ports.

In some embodiments, the selected FD basis vectors are commonly used for all layers and all CSI-RS ports. When delay is pre-compensated during CSI-RS precoding, the WD 22 may always select the DC component [1, 1, . . . , 1] of the FD basis vectors since the zeroth tap contains most of the channel knowledge. The DC component does not need to be reported in this case. Besides, the rest of M−1 FD basis vectors are selected among the $M_{tot}$−1 FD basis vectors, which may require at most $$\left\lceil \log_2\left(\binom{M_{tot}-1}{M-1}\right)\right\rceil \text{bits}$$

to report. When delay is not pre compensated during CSI-RS precoding, the WD 22 can select M FD basis vectors from $M_{tot}$ candidates, which may require at most $$\left\lceil \log_2\left(\binom{M_{tot}}{M}\right)\right\rceil \text{ bits}$$

to report. The bits for indicating the selected FD basis vectors can be included in PMI information fields $X_2$ which may be conveyed via CSI report part 2 group 1, as specified, for example, in Table 6.3.2.1.2-2A from 3GPP TS 38.212 v16.0.0.

In another embodiment, the FD basis vectors are selected per transmission layer, and the selected FD basis vectors per layer will be commonly used for all CSI-RS ports. In some embodiments, for each layer, the FD basis vectors are selected and reported in the same way as described in the last paragraph, however the number of bits required may be at most $$v*\left\lceil \log_2\left(\binom{M_{tot}-1}{M-1}\right)\right\rceil \text{ and } v*\left\lceil \log_2\left(\binom{M_{tot}}{M}\right)\right\rceil$$

for delay is pre-compensated and delay is not compensated during CSI-RS precoding respectively, where v is the transmission rank. The bits for indicating the selected FD basis vectors can be included in PMI information fields $X_2$ which may be conveyed via CSI report part 2 group 1, as specified, for example, in Table 6.3.2.1.2-2A from 3GPP TS 38.212 v16.0.0.

Port-Specific FD Basis Selection

In one case, the network node 16 can configure $M_{p,tot} \geq 1$ FD basis vectors to the WD 22 for CSI-RS port p that are commonly used for all transmission layers, for p=1, . . . , $N_{CSIRS}$. The FD basis vectors for port p can be used by the WD 22 to compress the DL channel for port p over FD. Across all ports, there are in total $M_{tot} = \Sigma_{p=1}^{N_{CSIRS}} M_{p,tot}$ FD basis vector candidates indicated to the WD 22, from which the WD 22 is configured to select and report M ($1 \leq M \leq M_{tot}$) FD basis vectors. Denote the number of selected FD basis vectors for port p as $M_p$ ($0 \leq M_p \leq M_{p,tot}$). Then $M = \Sigma_{p=1}^{N_{CSIRS}} M_p$ may hold. The selected $M_p$ basis vectors for port p may be used only for port p, in some embodiments.

In one embodiment, the WD 22 selects $M_p$ FD basis vectors and use them for port p across all transmission layers, for p=1, . . . , $N_{CSIRS}$. When delay is pre-compensated during CSI-RS precoding, the WD 22 may, for each port, select the DC component [1, 1, . . . , 1] of the FD basis vectors since the zeroth tap contains most of the channel energy. The DC component does not need to be reported in this case. The rest $M_p-1$ FD basis vectors for port p are selected among the rest $M_{p,tot}-1$ FD basis vectors for port p. In total, at most $$\sum_{p=1}^{N_{CSIRS}}\left\lceil \log_2\left(\binom{M_{p,tot}-1}{M_p-1}\right)\right\rceil$$

may be required to report which FD basis vectors are selected. When delay is not pre-compensated during CSI-RS precoding, WD 22 can select $M_p$ FD basis vectors from $M_{p,tot}$ for port p, which in total may require at most $$\sum_{p=1}^{N_{CSIRS}}\left\lceil \log_2\left(\binom{M_{p,tot}-1}{M_p}\right)\right\rceil$$

bits to report. The bits for indicating the selected FD basis vectors can be included in PMI information fields $X_2$ which may be conveyed via CSI report part 2 group 1, as specified, for example, in Table 6.3.2.1.2-2A from 3GPP TS 38.212 v16.0.0.

In another case, the network node 16 can configure $M_{p,tot}^{(l)} \geq 1$ FD basis vectors to the WD 22 for CSI-RS port p and transmission layer l, for p=1, . . . , $N_{CSIRS}$ and l=1, . . . , v. For layer l, there are in total $M_{tot}^{(l)} = \Sigma_{p=1}^{N_{CSIRS}} M_{p,tot}^{(l)}$ FD basis vector candidates indicated to the WD 22, from which the WD 22 is configured to select and report $M_p^{(l)}$ for port p and layer l. If there is a constraint on the total number of selected FD basis vectors per layer, say $M^{(l)}$, which can be configured/signaled by the network node 16 (via RRC/MAC CE/DCI for example), then $M^{(l)} = \Sigma_{p=1}^{N_{CSIRS}} M_p^{(l)}$ should hold. If there is a constraint on the total number of selected FD basis vectors across all layers, say M, which can be configured by network node 16 (via RRC/MAC CE/DCI for example), then $M = \Sigma_{l=1}^{v} \Sigma_{p=1}^{N_{CSIRS}} M_p^{(l)}$ should hold.

In one embodiment, for transmission layer l and each CSI-RS port p, the WD 22 selects $M_p^{(l)}$ out of the $M_{p,tot}^{(l)}$ indicated FD basis vector candidates. If delay is pre-compensated during CSI-RS precoding, the WD 22 may always select the DC component [1, 1, . . . , 1] of the FD basis vectors since the zeroth tap contains most of the channel energy. The DC component may not need to be reported in this case. The rest $M_p^{(l)}-1$ FD basis vectors for port p are selected among the rest $M_{p,tot}^{(l)}-1$ FD basis vectors for port p. In total, at most $$\sum_{l=1}^{v} \sum_{p=1}^{N_{CSIRS}}\left\lceil \log_2\left(\binom{M_{p,tot}^{(l)}-1}{M_p^{(l)}-1}\right)\right\rceil$$

may be required to report which FD basis vectors are selected. If delay is not pre-compensated during CSI-RS precoding, the WD 22 may select $M_p^{(l)}$ FD basis vectors from $M_{p,tot}^{(l)}$ for port p and layer l, which in total may require at most $$\sum_{l=1}^{v} \sum_{p=1}^{N_{CSIRS}}\left\lceil \log_2\left(\binom{M_{p,tot}^{(l)}}{M_p^{(l)}}\right)\right\rceil \text{bits}$$

to report. The bits for indicating the selected FD basis vectors can be included in PMI information fields $X_2$ which may be conveyed via CSI report part 2 group 1, as specified, for example, in Table 6.3.2.1.2-2A from 3GPP TS 38.212 v16.0.0.

WD Using all FD Basis Vectors Indicated by a Network Node, e.g., gNB

In another embodiment, when the WD 22 is configured to use all the indicated FD basis vectors, either layer-common or layer-specific, for PMI reporting, there is no need to report the selected FD basis vectors as all of them will be selected.

Reporting of Linear Combination Coefficients

The linear combination coefficients (LCCs) may be reported so that the network node 16 knows how to combine the selected SD-FD basis pairs and FD basis vectors. Each LCC combines a particular SD-FD basis pair and the corresponding FD basis vector. The reporting of LCC contains two parts: the bitmap of non-zero coefficients (NZC) indicating which coefficients are non-zero and reported, and the quantized value of each reported NZC (including strongest coefficient indicator (SCI), wideband reference amplitude and differential subband amplitude and phase of each NZC).

Reporting of NZC Bitmap

Due to delay pre-compensation, the NZC bitmap reporting can consume fewer bits than in 3GPP Rel-16. With delay being compensated at the network node 16, the WD 22 sees a flatter channel, and most channel knowledge can be captured by the DC FD basis vector. For each layer, there are $N_{p,sel}$ SD-FD basis pairs and M FD basis vectors selected and reported, which may require in total $MN_{p,sel}$ coefficients to combine them. Some of these coefficients are small and set to zero and only the NZCs are reported. Moreover, due to DC component being always selected, in some embodiments, at least $N_{p,sel}$ coefficients that are associated with the DC FD component may always be non-zero and need to be reported. Therefore, denote the number of NZCs to report as $K_{NZ}$ for a given layer, which is configured by the network node 16 (via RRC/MAC CE/DCI for example), then $N_{p,sel} \leq K_{NZ} \leq MN_{p,sel}$ may hold.

In one embodiment, the bitmaps for indicating NZCs and the selected SD-FD basis pairs can be jointly encoded to save reporting overhead. To be more specific, for each transmission layer, there are always $N_{p,sel}$ NZC coefficients that are associated with the DC FD basis vector, which may require at most $$\left\lceil \log_2\left(\binom{N_{p,tot}}{N_{p,sel}}\right)\right\rceil \text{ bits}$$

to report to network node 16. However, due to the fact that an NZC also corresponds to a unique selected SD-FD basis pair, it is sufficient to indicate the NZC corresponding to the DC FD basis vector using the indication of selected SD-FD basis pairs (or vice versa). Indicating the remaining $K_{NZ} - N_{p,sel}$ NZCs associated with the remaining of FD basis vectors, if any, may require at most $(M-1)N_{p,sel}$ bits. Hence, in total at most $(M-1)N_{p,sel}$ bits may be required to report the NZCs for a given layer if the NZCs for the DC FD basis vector is not reported (i.e., they are inferred from selected SD-FD basis pairs), or at most $MN_{p,sel}$ bits are needed if the NZCs for the DC FD basis vector is reported, in which case the selected SD-FD basis pairs can be inferred from NZC bitmap and do not need to be indicated. These bits can be conveyed via CSI report part 2 group 1, as specified in Table 6.3.2.1.2-2A from 3GPP TS 38.212 v16.0.0. When M>1, i.e., multiple FD components (DC component always included) are selected, the selected SD-FD basis pairs can be inferred by the network node 16 from the part of NZC bitmap that corresponds to the DC FD component. Therefore, the selected SD-FD basis pairs do not need to be reported. When M=1, i.e., only the DC FD basis vector is selected, NZC bitmap and selected SD-FD basis pairs may have one-to-one mapping, in which case only one of them may be reported.

Figure 20:
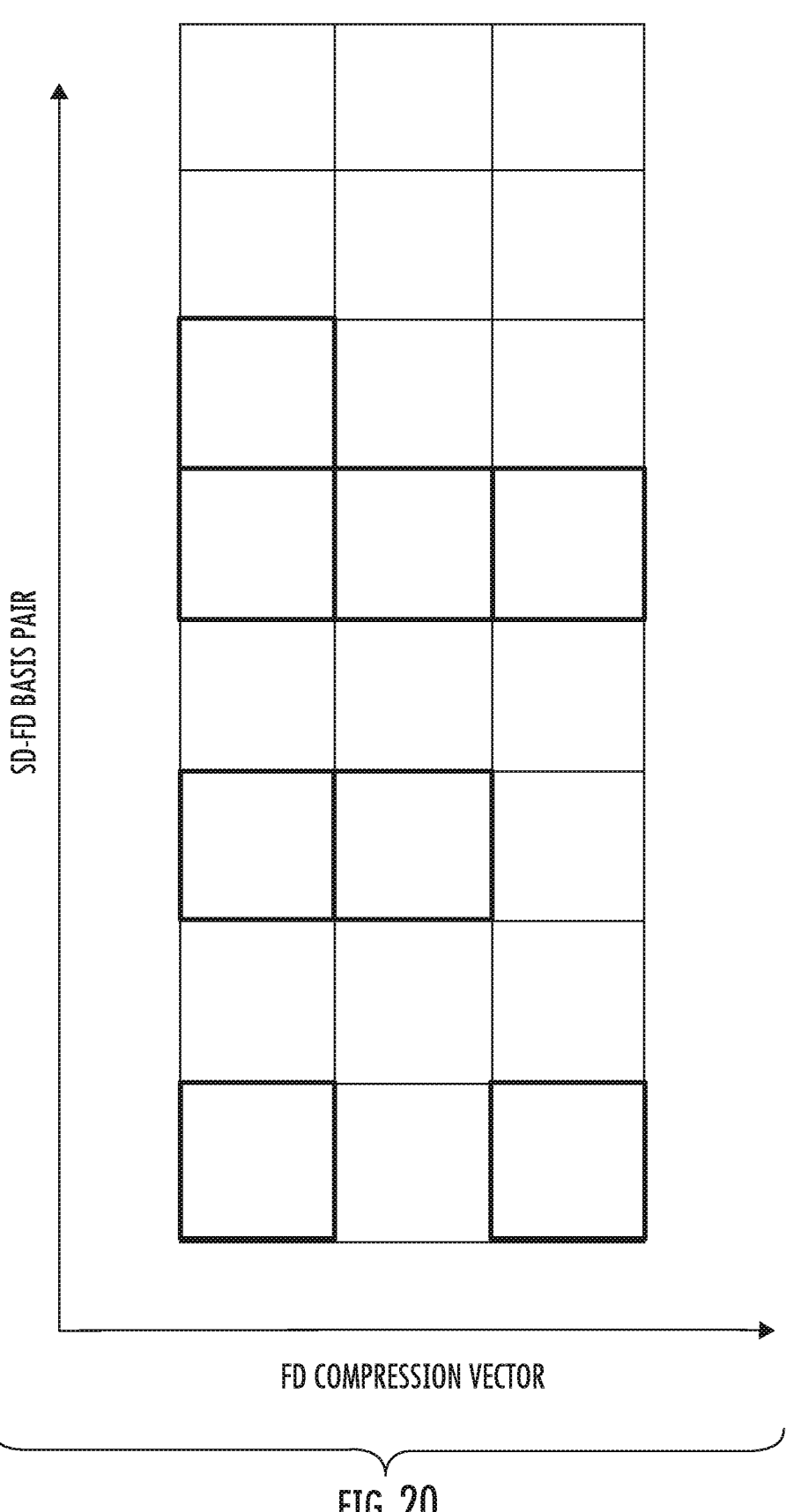
FIG. 20 illustrates an example of joint indication non-zero coefficient (NZC) and selected SD-FD basis pairs.

FIG. 20 shows an example of the above-mentioned joint encoding of NZC bitmap and selected SD-FD basis pairs, where $N_{p,tot}=8$, $N_{p,sel}=4$, M=3 and $K_{NZ}=8$. Each square in the figure represents a coefficient that is associated with an SD-FD basis pair and a FD basis vector, where the squares encompassed by a dark border correspond to the reported NZCs and the squares not encompassed by a dark border correspond to zero coefficients that are not reported. The first column corresponds to the DC FD component for channel compression, while the other two columns are two other FD components either indicated to the WD 22 by the network node 16 or selected by the WD 22. In this example, the $3^{rd}$, $4^{th}$, $6^{th}$ and $8^{th}$ SD-FD basis pairs are selected, which have one-to-one mapping to the NZCs in the DC component. Therefore, $$\left\lceil \log_2\left(\binom{8}{4}\right)\right\rceil = 7 \text{ bits}$$

may be required for indicating both the selected SD-FD basis and the corresponding NZCs for the DC FD component. Besides the 4 NZCs for the DC FD component, 4 additional NZCs are reported, which are selected for the same 4 SD-FD basis pairs associated with the other two FD components. To indicate the location of these additional 4 NZCs, 4×2=8 more bits may be needed. Hence, in total, 7+8=15 bits may be needed to indicate the selected SD-FD basis pairs and the NZC bitmap. In the legacy 3GPP Rel-16 reporting framework, $$\left\lceil \log_2\left(\binom{8}{4}\right)\right\rceil = 7 \text{ bits}$$

are needed to indicate the selected SD-FD basis pairs (or rather the selected CSI-RS ports), while 4×3=12 bits are needed for NZCs bitmap, i.e., a total of 7+12=19 bits may be required. Thus, 19−15=4 bits can be saved using the proposed reporting method.

Reporting of Strongest Coefficient Indicator

Because of delay pre-compensation, the DC FD component may always be selected, which preserves the strongest tap. The strongest coefficient is expected to be associated with the DC FD basis vector. Therefore, for each layer, the strongest coefficient indicator (SCI) may require at most $\lceil \log_2(N_{p,sel})\rceil$ bits to indicate and report to the network node 16. These bits can be conveyed via CSI report part 2 group 0, for example, as specified in Table 6.3.2.1.2-2A from 3GPP TS 38.212 v16.0.0.

In one embodiment, the SCI for a given transmission layer is indicated by the location of the strongest LCC for the DC FD component for that layer, in order to reduce reporting overhead.

Reporting of Total Number of NZCs

The total number of NZCs can be used to determine the payload size of CSI report part 2. In one embodiment, denote the total number of NZCs across all layers as $K_{NZ,tot}$, which can be configured by the network node 16 (via RRC/MAC CE/DCI, for example). Since the coefficients associated with the DC-component are always non-zero, $K_{NZ,tot} \geq vN_{p,sel}$ should hold, where v is the transmission rank. Therefore, only the number of the remaining NZCs may be known to the network node 16, which may require at most $[\log_2(K_{NZ,tot} - vN_{p,sel})]$ bits to report. These bits can be conveyed via CSI report part 1, as specified in Table 6.3.2.1.2-2A from 3GPP TS 38.212 v16.0.0. The network node 16 may obtain the total number of NZCs, which is needed to determine the payload size of CSI report part 2, by adding the reported number of NZCs (i.e., the number of NZCs excluding those associated with the DC FD component) and $vN_{p,sel}$ (the number of SD-FD pairs selected across all layers).

Using the example in FIG. 20 again and assuming a single layer transmission, then $\lceil \log_2(8-4) \rceil = 2$ bits may be needed for reporting the total number of NZCs in some embodiments, whereas it may require $\lceil \log_2(8) \rceil = 3$ bits with the 3GPP Rel-16 legacy reporting framework.

Some embodiments may include some of the following.

E1. A method performed by WD for CSI feedback, the method constituting one or more of the following:

receiving configuration of a CSI-RS resource from a network node with a plurality of $N_{CSIRS}$ CSI-RS ports wherein each CSI-RS port is associated with $N_p \geq 1$ pair(s) of vectors in the spatial domain and the frequency domain;

receiving a configuration and/or request from the network node for CSI feedback using a type II port selection codebook;

determining a subset of frequency domain basis vectors out of Mtot frequency domain basis vectors which are complex DFT vectors;

computing CSI which includes one or more of the following steps:

selecting a subset of ports from the plurality of $N_{CSIRS}$ CSI-RS ports and one or more pair(s) of vectors in the spatial domain and frequency domain;

selecting a subset or the whole set out of the determined subset of frequency domain basis vectors; and computing linear combination coefficients corresponding to the pair(s) of vectors in the spatial domain and frequency domain associated with the selected subset of CSI-RS ports and the selected subset or whole set of the determined frequency domain basis vectors;

transmitting a CSI report message including one or more of the following:

the selected CSI-RS ports and the pair(s) of vectors in the spatial domain and frequency domain associated with the selected CSI-RS ports;

the selected subset or whole set of the determined frequency domain basis vectors; and the corresponding linear combination coefficients, including quantized coefficient values, a bitmap for indicating non-zero coefficients, and an indication of strongest coefficients.

E2. The method of E1 wherein, the WD jointly selects the subset of CSI-RS ports and the pairs of vectors in the spatial domain and frequency domain wherein the selected ports and pairs are common for all transmission layers.

E3. The method of E2 wherein a subset of Np,sel pairs of vectors in the spatial domain and frequency domain are chosen in a polarization-specific manner out of the total number of $N_p N_{CSIRS}$ pairs of vectors in the spatial domain and frequency domain across all CSI-RS ports using at most $$\left\lceil \log_2\left( \binom{N_p N_{CSIRS}}{N_{sel}} \right) \right\rceil \text{ bits.}$$

E3. The method of E2 wherein a subset of Np,sel/2 pairs of vectors in the spatial domain and frequency domain are chosen that are common to both polarizations out of the total number of $N_p N_{CSIRS}/2$ pairs of vectors in the spatial domain and frequency domain across all CSI-RS ports using at most $$\left\lceil \log_2\left( \binom{N_p N_{CSIRS}/2}{N_{p,sel}/2} \right) \right\rceil \text{ bits.}$$

E5. The method of E2 wherein all pairs of vectors in the spatial domain and frequency domain corresponding to the selected subset of CSI-RS ports are chosen.

E6. The method of E1 wherein, for each transmission layer, the WD jointly selects the subset of CSI-RS ports and the pairs of vectors in the spatial domain and frequency domain.

E7. The method of E6 wherein a subset of Np,sel pairs of vectors in the spatial domain and frequency domain are chosen in a polarization-specific manner out of the total number of $N_p N_{CSIRS}$ pairs of vectors in the spatial domain and frequency domain across all CSI-RS ports using at most $$v\left\lceil \log_2\left( \binom{N_p N_{CSIRS}}{N_{p,sel}} \right) \right\rceil$$

where v is the total number of transmission layers.

E8. The method of E6 wherein a subset of Np,sel/2 pairs of vectors in the spatial domain and frequency domain are chosen that are common to both polarizations out of the total number of $N_p N_{CSIRS}/2$ pairs of vectors in the spatial domain and frequency domain across all CSI-RS ports using at most $$v\left\lceil \log_2\left( \binom{N_p N_{CSIRS}/2}{N_{p,sel}/2} \right) \right\rceil \text{ bits}$$

where v is the total number of transmission layers.

E9. The methods of E6 where the selected pairs of vectors are indicated by a non-zero coefficient bitmap that indicates the non-zero linear combination coefficients corresponding to the selected pairs.

E10. The method of E1 where the determining of a subset of frequency domain basis vectors is based on a set of frequency domain basis vectors indicated to the WD by the network node.

E11. The method of any of E1 and E10, wherein selected subset or whole set of the determined frequency domain basis vectors is commonly used for all transmission layers.

E12. The method of any of E1 and E10, wherein for each transmission layer, a subset or whole set of the determined frequency domain basis vectors is selected.

E13. The method of any of E1, E10, E11, and E12 wherein selected subset or whole set of the determined frequency domain basis vectors is commonly used for all selected CSI-RS ports.

E14. The method of any of E1, E10, E11, and E12 wherein for each selected CSI-RS port, a subset or whole set of the determined frequency domain basis vectors is selected.

E15. The method of E1 where the bitmap for indicating the non-zero coefficients (NZCs) and the selected the pairs of vectors in the spatial domain and frequency domain (or the selected CSI-RS ports) are jointly encoded to save WD reporting overhead.

E16. The method of any of E1 and E15, wherein the bitmap for indicating NZCs are reported while the selected pairs of vectors in the spatial domain and frequency domain (or the selected CSI-RS ports) are not reported. gNB infers the selected pairs of vectors in the spatial domain and frequency domain (or the selected CSI-RS ports) based on the reported NZC bitmap.

E17. The method of any of E1, E15 and E16, wherein the NZC bitmap associated with the DC frequency-domain basis vector and the NZC bitmap associated with other frequency-domain basis vectors are jointly encoded.

E18. The method of any of E1, E15, E16 and E17, wherein the NZC bitmap associated with non-DC frequency domain basis vectors is based on the NZC bitmap for the DC frequency domain basis vector.

E19. The method of any of E1 and E15, wherein the selected pairs of vectors in the spatial domain and frequency domain (or the selected CSI-RS ports) are reported while the bitmap for indicating NZCs are not reported, at least that associated with the DC frequency domain basis vector. GNB infers the NZCs based on the reported pairs of vectors in spatial and frequency domain (or the reported CSI-RS ports).

E20. The method of E1 where the location of the strongest linear combination coefficient for all the frequency domain basis vectors of a given layer is indicated by location of the strongest linear combination coefficient for the DC frequency domain basis vector of that layer.

E21. The method of E1 where the WD only reports the total number of NZCs that are associated with non-DC frequency domain basis vectors.

E22. The method performed by the gNB, where the total number of NZCs are calculated by summing the total number of NZCs associated with non-DC frequency domain basis vectors (obtained from E21) and the total number of selected pairs of vectors in the spatial domain and frequency domain.

Some embodiments may include one or more of the following:

Embodiment A1. A network node configured to communicate with a wireless device (WD), the network node configured to, and/or comprising a radio interface and/or comprising processing circuitry configured to perform at least one of:

configure the WD with a total number M of frequency domain basis vectors of a discrete Fourier transform;

associate each of $NCSI_{RS}$ channel state information reference signal, CSI-RS, ports with $N_p$ pairs of vectors in a spatial domain and a frequency domain;

transmit the association to the WD; and receive from the WD at least one of:

an indication of a selection by the WD of a subset of the $N_{CSI-RS}$ ports;

an indication of a selection by the WD of a subset of pairs of vectors in the spatial domain and the frequency domain;

an indication of a selection by the WD of a subset of frequency domain vectors;

an indication of a set of linear combination coefficients associated with the selected subset of the CSI-RS ports and the corresponding selected frequency domain basis vectors;

an indication of a set of linear combination coefficients associated with the selected subset of pairs of vectors and the corresponding selected frequency domain basis vectors; and an indication of the total number of non-zero linear combination coefficients associated with non-DC frequency domain basis vectors in the selected subset, or an indication of the total number of non-zero linear combination coefficients associated with all frequency domain basis vectors in the selected subset.

Embodiment A2. The network node of Embodiment A1, wherein the network node, radio interface, and/or processing circuitry are configured to perform at least one of:

receive a non-zero coefficient, NZC, bitmap;

receive information bits indicating location of strongest coefficient;

receive information bits indicating the number of NZCs;

determine at least one of the selected pairs of vectors and the selected CSI-RS ports based at least in part on the NZC bitmap;

determine the NZC bitmap associated with all selected frequency domain basis vectors based on the received NZC;

determine the location of the strongest coefficient based on the received information bits indicating location of strongest coefficient; and determine the total number of NZCs based on the received information bits indicating the number of NZCs.

Embodiment A3. The network node of Embodiment A2, wherein the NZC bitmap is associated with a DC frequency domain basis vector.

Embodiment A4. The network node of Embodiment A2, wherein a NZC bitmap associated with a DC frequency domain basis vector is jointly encoded with an NZC bitmap associated with non-DC frequency domain basis vectors.

Embodiment A5. The network node of Embodiment A2, wherein the NZC bitmap is associated with non-DC frequency domain basis vectors.

Embodiment A6. The network node of Embodiment A5, wherein the NZC bitmap associated DC frequency domain basis vector is treated as all ones, and the NZC bitmap associated with all frequency domain basis vectors is obtained by aggregating the NZC bitmap for non-DC frequency domain basis vectors and the bitmap for the associated DC frequency domain basis vector.

Embodiment A7. The network node of any of Embodiments A2-A6, wherein a location of a strongest linear combination coefficient for all frequency domain basis vectors of a transmission layer is indicated by a location of a strongest linear combination coefficient of the DC frequency domain basis vectors.

Embodiment A8. The network node of Embodiments A2, wherein the information bits indicating the number of NZCs correspond to the number of NZCs associated with the selected non-DC frequency domain basis vectors.

Embodiment A9. The network node of Embodiment A8, wherein the total number of NZCs associated with all selected frequency domain basis vectors is determined by summing the received number of NZCs and the number of selected CSI-RS ports or pairs of vectors.

Embodiment B1. A method in a network node, the method comprising performing at least one of:

configuring the WD a total number M of frequency domain basis vectors of a discrete Fourier transform;

associating each of $NCSI_{RS}$ channel state information reference signal, CSI-RS, ports with $N_p$ pairs of vectors in a spatial domain and a frequency domain;

transmitting the association to the WD; and receiving from the WD at least one of:

an indication of a selection by the WD of a subset of the $N_{CSI-RS}$;

an indication of a selection by the WD of a subset of pairs of vectors in the spatial domain and the frequency domain;

an indication of a selection by the WD of a subset of frequency domain vectors;

an indication of a set of linear combination coefficients associated with the selected subset of the CSI-RS ports and the corresponding selected frequency domain basis vectors;

43 an indication of a set of linear combination coefficients associated with the selected subset of pairs of vectors and the corresponding selected frequency domain basis vectors; and an indication of the total number of non-zero linear combination coefficients associated with non-DC frequency domain basis vectors in the selected subset, or an indication of the total number of non-zero linear combination coefficients associated with all frequency domain basis vectors in the selected subset.

Embodiment B2. The method of Embodiment B1, further comprising:

receiving a non-zero coefficient, NZC, bitmap;

receiving information bits indicating location of strongest coefficient;

receive information bits indicating the number of NZCs;

determining at least one of the selected pairs of vectors and the selected CSI-RS ports based at least in part on the NZC bitmap;

determining the NZC bitmap associated with all selected frequency domain basis vectors based on the received NZC;

determining the location of the strongest coefficient based on the received information bits indicating location of strongest coefficient; and determining the total number of NZCs based on the received information bits indicating the number of NZCs.

Embodiment B3. The method of Embodiment B2, wherein the NZC bitmap is associated with a DC frequency domain basis vector.

Embodiment B4. The method of Embodiment B2, wherein a NZC bitmap associated with a DC frequency domain basis vector is jointly encoded with an NZC bitmap associated with non-DC frequency domain basis vectors.

Embodiment B5. The method of Embodiment B2, wherein the NZC bitmap is associated with non-DC frequency domain basis vectors.

Embodiment B6. The method of Embodiment B5, wherein the NZC bitmap associated DC frequency domain basis vector is treated as all ones, and the NZC bitmap associated with all frequency domain basis vectors is obtained by aggregating the NZC bitmap for non-DC frequency domain basis vectors and the bitmap for the associated DC frequency domain basis vector.

Embodiment B7. The method of any of Embodiments B2-B6, wherein a location of a strongest linear combination coefficient for all frequency domain basis vectors of a transmission layer is indicated by a location of a strongest linear combination coefficient of the DC frequency domain basis vectors.

Embodiment B8. The method of Embodiments B2, wherein the information bits indicating the number of NZCs correspond to the number of NZCs associated with the selected non-DC frequency domain basis vectors.

Embodiment B9. The method of Embodiment B8, wherein the total number of NZCs associated with all selected frequency domain basis vectors is determined by summing the received number of NZCs and the number of selected CST-RS ports or pairs of vectors.

Embodiment C1. A wireless device (WD) configured to communicate with a network node, the WD configured to, and/or comprising a radio interface and/or processing circuitry configured to perform at least one of:

determine a subset of frequency domain vectors out of a total number M of frequency domain basis vectors of a discrete Fourier transform;

select a subset of CSI-RS ports out of a total number $N_{CSI-RS}$ of CSI-RS ports, each port being associated with $N_p \geq 1$ pairs of vectors in the spatial domain and the frequency domain;

select a subset of pairs of vectors in the spatial domain and the frequency domain across $N_{CSI-RS}$ CSI-RS ports;

compute linear combination coefficients corresponding to the selected frequency domain basis and the selected subset of CSI-RS ports;

compute linear combination coefficients corresponding to the selected frequency domain basis and the selected subset of pairs of vectors in the spatial domain and the frequency domain; and transmit a CSI report message comprising at least one of the following:

an indication of the selected subset of frequency domain basis vectors of a discrete Fourier transform;

an indication of the selected subset of CSI-RS ports;

an indication of the selected subset of pairs of vectors in the spatial domain and the frequency domain;

an indication of the corresponding linear combination coefficients; and an indication of the total number of non-zero linear combination coefficients associated with non-DC frequency domain basis vectors in the selected subset, or an indication of the total number of non-zero linear combination coefficients associated with all frequency domain basis vectors in the selected subset.

Embodiment C2. The WD of Embodiment C1, wherein the subset of CSI-RS ports and the subset of pairs of vectors are jointly selected and reported.

Embodiment C3. The WD of any of Embodiments C1 and C2, wherein the WD, radio interface and/or processing circuitry are further configured to make a polarization-specific selection of a subset of $N_{p,sel}$ pairs of vectors out of a total of $N_p N_{CSI-RS}$ pairs of vectors using at most $$\left\lceil \log_2\left( \binom{N_p N_{CSIRS}}{N_{p,sel}} \right) \right\rceil \text{ bits}$$

to report.

Embodiments C4. The WD of any of Embodiments C1 and C2, wherein the WD, radio interface and/or processing circuitry are further configured to choose a subset of $N_{p,sel}/2$ pairs of vectors that are common to two polarizations out of a total of $N_p N_{CSI-RS}/2$ pairs of vectors using at most $$\left\lceil \log_2\left( \binom{N_p N_{CSIRS}/2}{N_{p,sel}/2} \right) \right\rceil \text{ bits}$$

to report.

Embodiment C5. The WD of any of Embodiments C1 and C2, wherein the WD, radio interface and/or processing circuitry are further configured to make a polarization-specific selection of a subset of $N_{p,sel}$ pairs of vectors out of a total of $N_p N_{CSI-RS}$ pairs of vectors using at most $$v\left\lceil \log_2\left( \binom{N_p N_{CSIRS}}{N_{p,sel}} \right) \right\rceil \text{ bits}$$

to report, where v is a total number of transmission layers.

Embodiment C6. The WD of any of Embodiments C1 and C2, wherein the WD, radio interface and/or processing circuitry are further configured to choose a subset of $N_{p,sel}/2$ pairs of vectors that are common to two polarizations out of a total of $N_pN_{CSI-RS}/2$ pairs of vectors using at most $$v\left\lceil \log_2\left(\binom{N_pN_{CSIRS}/2}{N_{p,sel}/2}\right)\right\rceil \text{ bits}$$

to report, where v is a total number of transmission layers.

Embodiment C7. The WD of any of Embodiments C1-C6, wherein an indication for the selected subset of CSI-RS ports or for the selected subset of pairs of vectors are jointly encoded and reported with an indication for the corresponding non-zero coefficients (NZCs).

Embodiment C8. The WD of any of Embodiments C1-C7, wherein the reported NZC bitmap is only associated with non-DC frequency domain basis vectors.

Embodiment C9. The WD of any of Embodiments C1-C7, wherein the selected subset of pairs of vectors are indicated by a non-zero coefficient (NZC) bitmap that indicates non-zero linear combination coefficients corresponding to the selected pairs.

Embodiment C10. The WD of Embodiment C9, wherein a NZC bitmap associated with a DC frequency domain basis vector is jointly encoded with a NZC bitmap associated with non-DC frequency domain basis vectors.

Embodiment C11. The WD of any of Embodiments C1-C10, wherein a location of a strongest linear combination coefficient associated with all frequency domain basis vectors of a transmission layer is indicated by a location of a strongest linear combination coefficient associated with the DC frequency domain basis vector.

Embodiment C12 The WD of any of Embodiments C1-C11, wherein the total number of NZCs associated with non-DC frequency domain basis vectors are reported.

Embodiment D1. A method in a wireless device (WD, the method comprising performing at least one of:

determining a subset of frequency domain vectors out of a total number M of frequency domain basis vectors of a discrete Fourier transform;

selecting a subset of CSI-RS ports out of a total number $N_{CSI-RS}$ of CSI-RS ports, each port being associated with $N_p \geq 1$ pairs of vectors in the spatial domain and the frequency domain;

selecting a subset of pairs of vectors in the spatial domain and the frequency domain across $N_{CSI-RS}$ CSI-RS ports;

computing linear combination coefficients corresponding to the selected frequency domain basis and the selected subset of CST-RS ports;

computing linear combination coefficients corresponding to the selected frequency domain basis and the selected subset of pairs of vectors in the spatial domain and the frequency domain; and transmitting a CSI report message comprising at least one of the following:

an indication of the selected subset of frequency domain basis vectors of a discrete Fourier transform;

an indication of the selected subset of CSI-RS ports;

an indication of the selected subset of pairs of vectors in the spatial domain and the frequency domain;

an indication of the corresponding linear combination coefficients; and an indication of the total number of non-zero linear combination coefficients associated with non-DC frequency domain basis vectors in the selected subset, or an indication of the total number of non-zero linear combination coefficients associated with all frequency domain basis vectors in the selected subset.

Embodiment D2. The method of Embodiment D1, wherein the subset of CSI-RS ports and the subset of pairs of vectors are jointly selected and reported.

Embodiment D3. The method of any of Embodiments D1 and D2, further comprising making a polarization-specific selection of a subset of $N_{p,sel}$ pairs of vectors out of a total of $N_pN_{CSI-RS}$ pairs of vectors using at most $$\left\lceil \log_2\left(\binom{N_pN_{CSIRS}}{N_{p,sel}}\right)\right\rceil \text{ bits}$$

to report.

Embodiments D4. The method of any of Embodiments D1 and D2, further comprising choosing a subset of $N_{p,sel}/2$ pairs of vectors that are common to two polarizations out of a total of $N_pN_{CSI-RS}/2$ pairs of vectors using at most $$\left\lceil \log_2\left(\binom{N_pN_{CSIRS}/2}{N_{p,sel}/2}\right)\right\rceil \text{ bits}$$

to report.

Embodiment D5. The method of any of Embodiments D1 and D2, further comprising making a polarization-specific selection of a subset of $N_{p,sel}$ pairs of vectors out of a total of $N_pN_{CSI-RS}$ pairs of vectors using at most $$v\left\lceil \log_2\left(\binom{N_pN_{CSIRS}}{N_{p,sel}}\right)\right\rceil \text{ bits}$$

to report, where v is a total number of transmission layers.

Embodiment D6. The method of any of Embodiments D1 and D2, further comprising choosing a subset of $N_{p,sel}/2$ pairs of vectors that are common to two polarizations out of a total of $N_pN_{CSI-RS}/2$ pairs of vectors using at most $$v\left\lceil \log_2\left(\binom{N_pN_{CSIRS}/2}{N_{p,sel}/2}\right)\right\rceil \text{ bits}$$

to report, where v is a total number of transmission layers.

Embodiment D7. The method of any of Embodiments D1-D6, wherein an indication for the selected subset of CSI-RS ports or for the selected subset of pairs of vectors are jointly encoded and reported with an indication for the corresponding non-zero coefficients (NZCs).

Embodiment D8. The method of any of Embodiments D1-D7, wherein the reported NZC bitmap is only associated with non-DC frequency domain basis vectors.

Embodiment D9. The method of any of Embodiments D1-D7, wherein the selected subset of pairs of vectors are indicated by a non-zero coefficient (NZC) bitmap that indicates non-zero linear combination coefficients corresponding to the selected pairs.

Embodiment D10. The method of Embodiment D9, wherein a NZC bitmap associated with a DC frequency domain basis vector is jointly encoded with a NZC bitmap associated with non-DC frequency domain basis vectors.

Embodiment D11. The method of any of Embodiments D1-D10, wherein a location of a strongest linear combination coefficient associated with all frequency domain basis vectors of a transmission layer is indicated by a location of a strongest linear combination coefficient associated with the DC frequency domain basis vector.

Embodiment D12. The method of any of Embodiments D1-D11, wherein the total number of NZCs associated with non-DC frequency domain basis vectors are reported.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device (WD), the network node comprising:

processing circuitry configured to configure the WD with a channel state information (CSI) report setting, the CSI report setting including at least one of:

a CSI reference signal (CSI-RS) resource with $N_{CSI\text{-}RS}$ CSI-RS ports for channel measurement, each of the $N_{CSI\text{-}RS}$ ports being associated with a pair of spatial domain (SD) and frequency domain (FD) vectors;

a first subset of length N3 frequency domain, FD, FD basis vectors of a discrete Fourier transform, the first subset comprising N basis vectors, one of which is a direct current (DC) basis vector containing all ones, where 1<=N<=N3; and a number M of FD basis vectors of a second subset of M FD basis vectors, the second subset being determined by the WD from the first subset of FD basis vectors, one of the M FD basis vectors being the DC basis vector, where M<=N; and a radio interface in communication with the processing circuitry and configured to:

transmit a CSI-RS to the WD;

request the WD to feedback a CSI based on a CSI-RS and according to the CSI report setting;

receive from the WD a CSI report comprising:

an indication of a number of transmission layers;

an indication of a selection by the WD of a subset of the $N_{CSI-RS}$ CSI-RS ports;

an indication of a selection by the WD of M FD basis vectors out of the N FD basis vectors;

an indication of a set of linear combination coefficients associated with the selected subset of the CSI-RS ports and the selected M frequency domain basis vectors per transmission layer; and an indication of a total number of non-zero linear combination coefficients associated with all the M frequency domain basis vectors; and the reporting being associated with $N_{p,sel}/2$ pairs of vectors that are common to two polarizations out of a total of $N_p N_{CSI-RS}/2$ pairs of vectors using at most $$\left\lceil \log_2\left(\binom{N_p N_{CSIRS}/2}{N_{p,sel}/2}\right)\right\rceil \text{bits},$$

wherein $N_{p,sel}$ is a total number of ports to be selected for both polarizations, and $N_p=1$.

2. The network node of claim 1, wherein the radio interface is further configured to receive a non-zero coefficient (NZC) bitmap, for each transmission layer, wherein each bit in the bitmap is associated with one of the selected CSI-RS ports and one of the M FD basis vectors.

3. The network node of claim 1, wherein the radio interface is configured to receive from the WD an indication of a selection by the WD of the M frequency domain basis vectors only when N is greater than one and M is less than N.

4. A method in a network node configured to communicate with a wireless device (WD), the method comprising:

configuring the WD with a channel state information (CSI) report setting, the CSI report setting including at least one of:

a CSI reference signal (CSI-RS) resource with $N_{CSI-RS}$ CSI-RS ports for channel measurement, each of the $N_{CSI-RS}$ ports being associated with a pair of spatial domain (SD) and frequency domain (FD) vectors;

a first subset of length N3 (FD) basis vectors of a discrete Fourier transform, the first subset comprising N basis vectors, one of which is a direct current (DC) basis vector containing all ones, where 1<=N<=N3; and a number M of FD basis vectors of a second subset of M FD basis vectors, the second subset being determined by the WD from the first subset of FD basis vectors, one of the M FD basis vectors being the DC basis vector, where M<=N;

transmitting a CSI-RS to the WD;

requesting the WD to feedback a CSI based on a CSI-RS and according to the CSI report setting;

receiving from the WD a CSI report comprising:

an indication of a number of transmission layers;

an indication of a selection by the WD of a subset of the $N_{CSI-RS}$ CSI-RS ports;

an indication of a selection by the WD of M FD basis vectors out of the N FD basis vectors;

an indication of a set of linear combination coefficients associated with the selected subset of the CSI-RS ports and the selected M frequency domain basis vectors per transmission layer; and an indication of one of a total number of non-zero linear combination coefficients (NZC) per transmission layer associated with non-DC frequency domain basis vectors in the M frequency domain basis vectors, and an indication of a total number of non-zero linear combination coefficients associated with all the M frequency domain basis vectors; and the reporting being associated with $N_{p,sel}/2$ pairs of vectors that are common to two polarizations out of a total of $N_p N_{CSI-RS}/2$ pairs of vectors using at most $$\left\lceil \log_2\left(\binom{N_p N_{CSIRS}/2}{N_{p,sel}/2}\right)\right\rceil \text{bits},$$

wherein $N_{p,sel}$ is a total number of ports to be selected for both polarizations, and $N_p=1$.

5. The method of claim 4, further comprising receiving a non-zero coefficient NZC bitmap, for each transmission layer, wherein each bit in the bitmap is associated with one of the selected CSI-RS ports and one of the M FD basis vectors.

6. The method of claim 4, further comprising receiving from the WD an indication of a selection by the WD of the M frequency domain basis vectors only when N is greater than one and M is less than N.

7. A wireless device (WD) configured to communicate with a network node, the WD comprising:

processing circuitry configured to:

receive a configuration of a channel state information (CSI) report setting, the CSI report setting including at least one of:

a CSI reference signal (CSI-RS) resource with $N_{CSI-RS}$ CSI-RS ports for channel measurement, each of the $N_{CSI-RS}$ ports being associated with a pair of spatial domain (SD) and frequency domain (FD) vectors;

a first subset of length N3 FD basis vectors of a discrete Fourier transform, the first subset including N basis vectors, one of which is a direct current (DC) basis vector containing all ones, where 1<=N<=N3; and a number M of a second subset of M FD basis vectors, the second subset being determined by the WD from the first subset of FD basis vectors, one of the M FD basis vectors being the DC basis vector, where <=N; and measure CSI based on the $N_{CSI-RS}$ CSI-RS ports and according to the CSI report setting, the measuring including at least one of:

selecting M FD basis vectors out of the N frequency domain basis vectors;

selecting a subset of CSI-RS ports out of the $N_{CSI-RS}$ CSI-RS ports; and determining a set of linear combination coefficients corresponding to the selected M frequency domain basis vectors and the selected subset of CSI-RS ports;

a radio interface in communication with the processing circuitry and configured to transmit a CSI report message comprising:

an indication of the selected M frequency domain basis vectors;

an indication of the selected subset of CSI-RS ports;

an indication of the set of linear combination coefficients; and an indication of a total number of non-zero linear combination coefficients associated with all the selected M FD basis vectors; and the processing circuitry is further configured to choose $N_{p,sel}/2$ pairs of vectors that are common to two polarizations out of a total of $N_p N_{CSI-RS}/2$ pairs of vectors using at most $$\left\lceil \log_2\left(\binom{N_p N_{CSIRS}/2}{N_{p,sel}/2}\right)\right\rceil \text{ bits}$$

to report for each transmission layer, wherein $N_{p,sel}$ is a total number of ports to be selected for both polarizations, and $N_p=1$.

8. The WD of claim 7, wherein, when N=1, the first subset of frequency domain basis vectors is a set containing only the DC frequency domain basis vector.

9. The WD of claim 7, wherein the radio interface is configured to transmit an indication of a selection of the selected M frequency domain basis vectors only when M≠N and M is greater than one.

10. The WD of claim 7, wherein the processing circuitry is further configured to select a second subset of frequency domain basis vectors for frequency domain channel compression.

11. The WD of claim 7, wherein the selected M frequency domain basis vectors is common for all transmission layers.

12. A method in a wireless device (WD) configured to communicate with a network node, the method comprising:

receiving a configuration of a channel state information (CSI) report setting, the CSI report setting including at least one of:

a CSI reference signal (CSI-RS) resource with $N_{CSI-RS}$ CSI-RS ports for channel measurement, each of the $N_{CSI-RS}$ ports being associated with a pair of spatial domain (SD) and frequency domain (FD) vectors;

a first subset of length N3 FD basis vectors of a discrete Fourier transform, the first subset including N basis vectors, one of which is a direct current (DC) basis vector containing all ones, where 1<=N<=N3; and a number M of a second subset of M FD basis vectors, the second subset being determined by the WD from the first subset of FD basis vectors, one of the M FD basis vectors being the DC basis vector, where <=N; and measuring CSI based on the $N_{CSI-RS}$ CSI-RS ports and according to the CSI report setting, the measuring including at least one of:

selecting M FD basis vectors out of the N frequency domain basis vectors;

selecting a subset of CSI-RS ports out of the $N_{CSI-RS}$ CSI-RS ports; and determining a set of linear combination coefficients corresponding to the selected M frequency domain basis vectors and the selected subset of CSI-RS ports;

transmitting a CSI report message comprising:

an indication of the selected M frequency domain basis vectors;

an indication of the selected subset of CSI-RS ports;

an indication of the set of linear combination coefficients; and an indication of a total number of non-zero linear combination coefficients associated with all the selected M FD basis vectors; and choosing $N_{p,sel}/2$ pairs of vectors that are common to two polarizations out of a total of $N_p N_{CSI-RS}/2$ pairs of vectors using at most $$\left\lceil \log_2\left(\binom{N_p N_{CSIRS}/2}{N_{p,sel}/2}\right)\right\rceil \text{ bits}$$

to report for each transmission layer, wherein $N_{p,sel}$ is a total number of ports to be selected for both polarizations, and $N_p=1$.

13. The method of claim 12, wherein, when N=1, the first subset of frequency domain basis vectors is a set containing only the DC frequency domain basis vector.

14. The method of claim 12, further comprising transmitting an indication of a selection of the selected M frequency domain basis vectors only when M≠N and M is greater than one.

15. The method of claim 12, further comprising selecting a second subset of frequency domain basis vectors for frequency domain channel compression.

16. The method of claim 12, wherein the selected M frequency domain basis vectors is common for all transmission layers.

* * * * *